Jan. 2, 1945.　　　H. T. AVERY　　　2,366,429
CARRIAGE SHIFT CONTROL MECHANISM
Filed Aug. 12, 1940　　　14 Sheets-Sheet 1

Inventor
HAROLD T. AVERY
By （signature）
Attorney

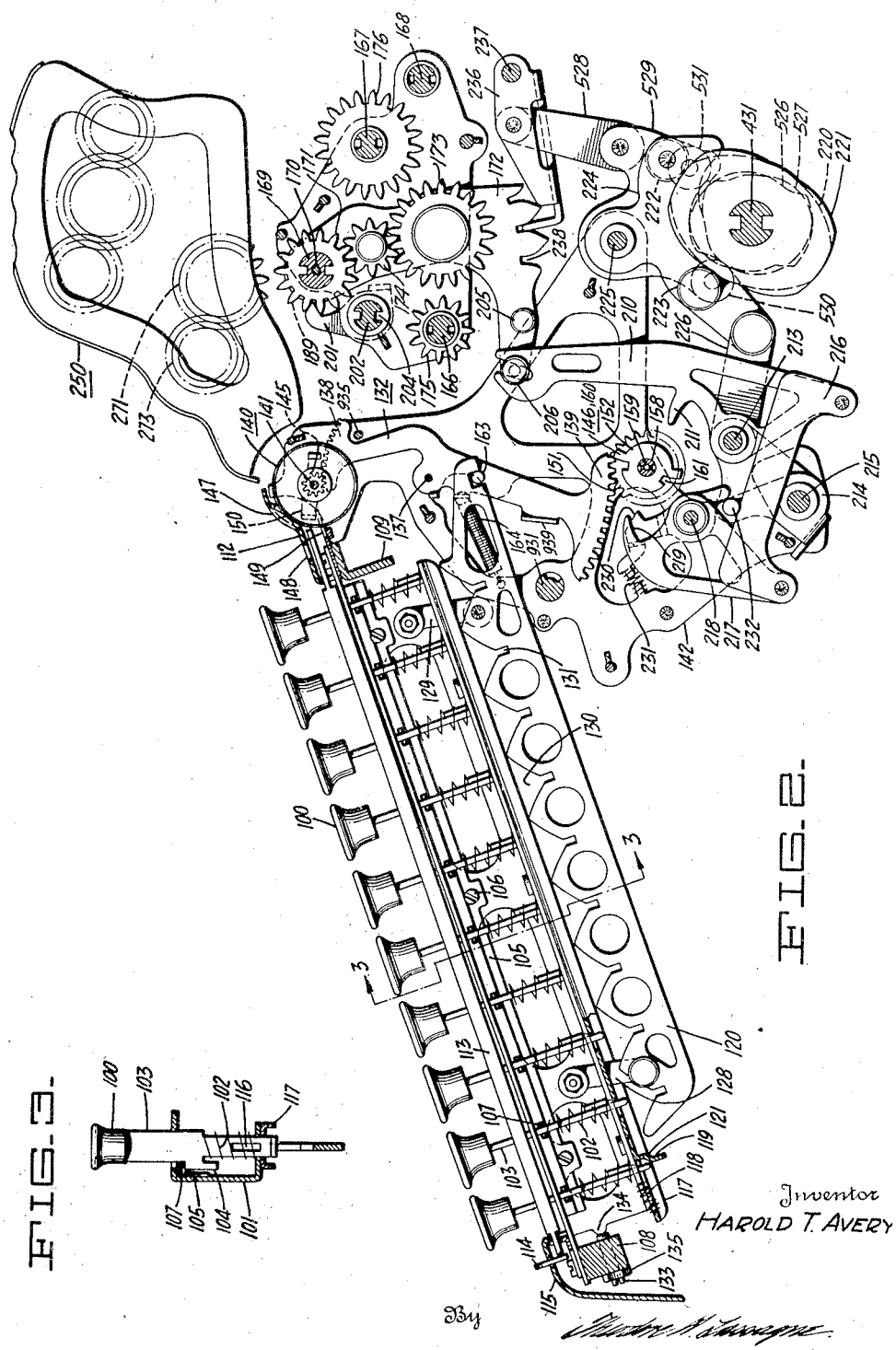

Jan. 2, 1945.  H. T. AVERY  2,366,429
CARRIAGE SHIFT CONTROL MECHANISM
Filed Aug. 12, 1940  14 Sheets-Sheet 3

Inventor
HAROLD T. AVERY

By
Attorney

Inventor
HAROLD T. AVERY

Jan. 2, 1945.  H. T. AVERY  2,366,429
CARRIAGE SHIFT CONTROL MECHANISM
Filed Aug. 12, 1940   14 Sheets-Sheet 5
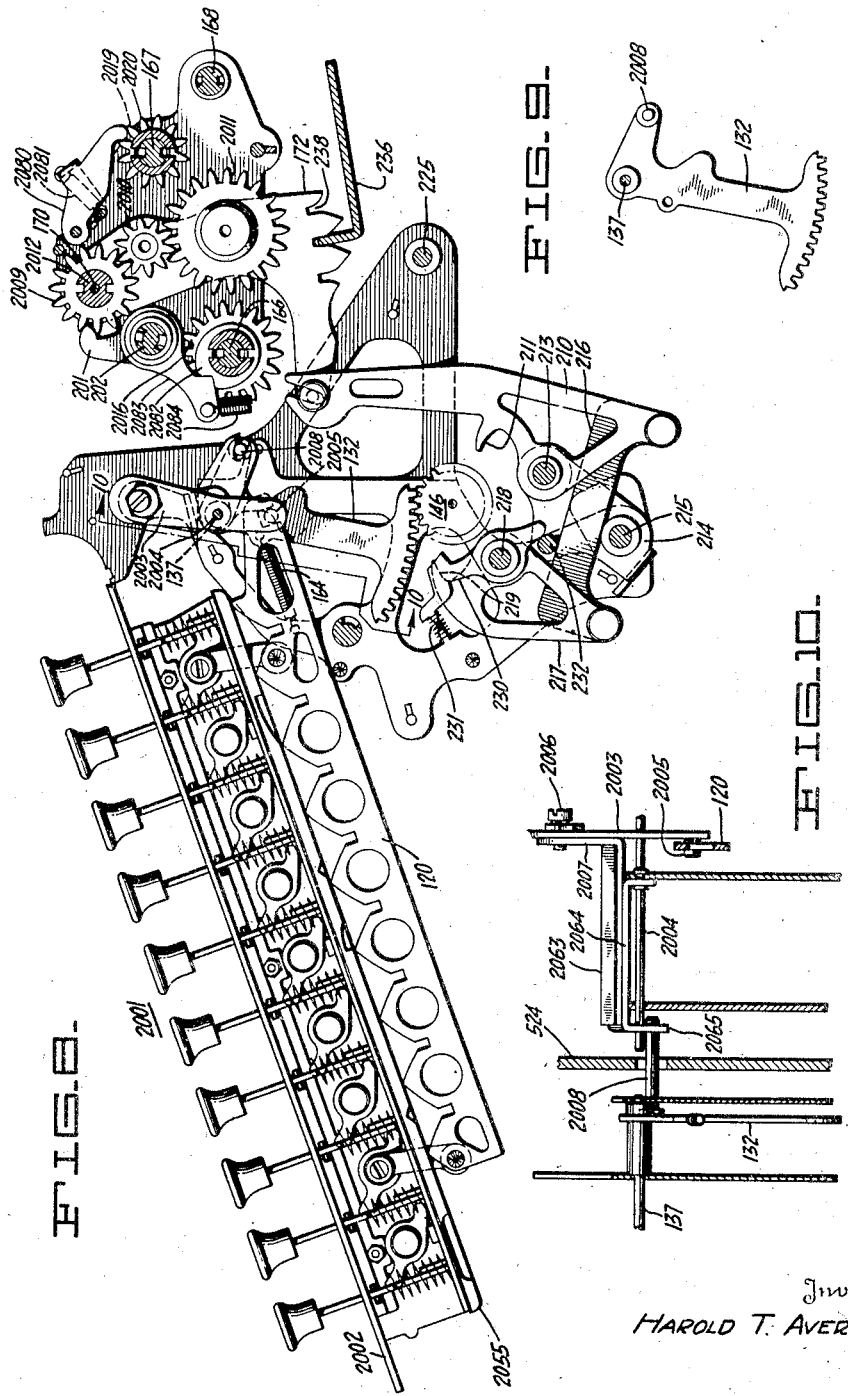
Inventor
HAROLD T. AVERY
By
Attorney

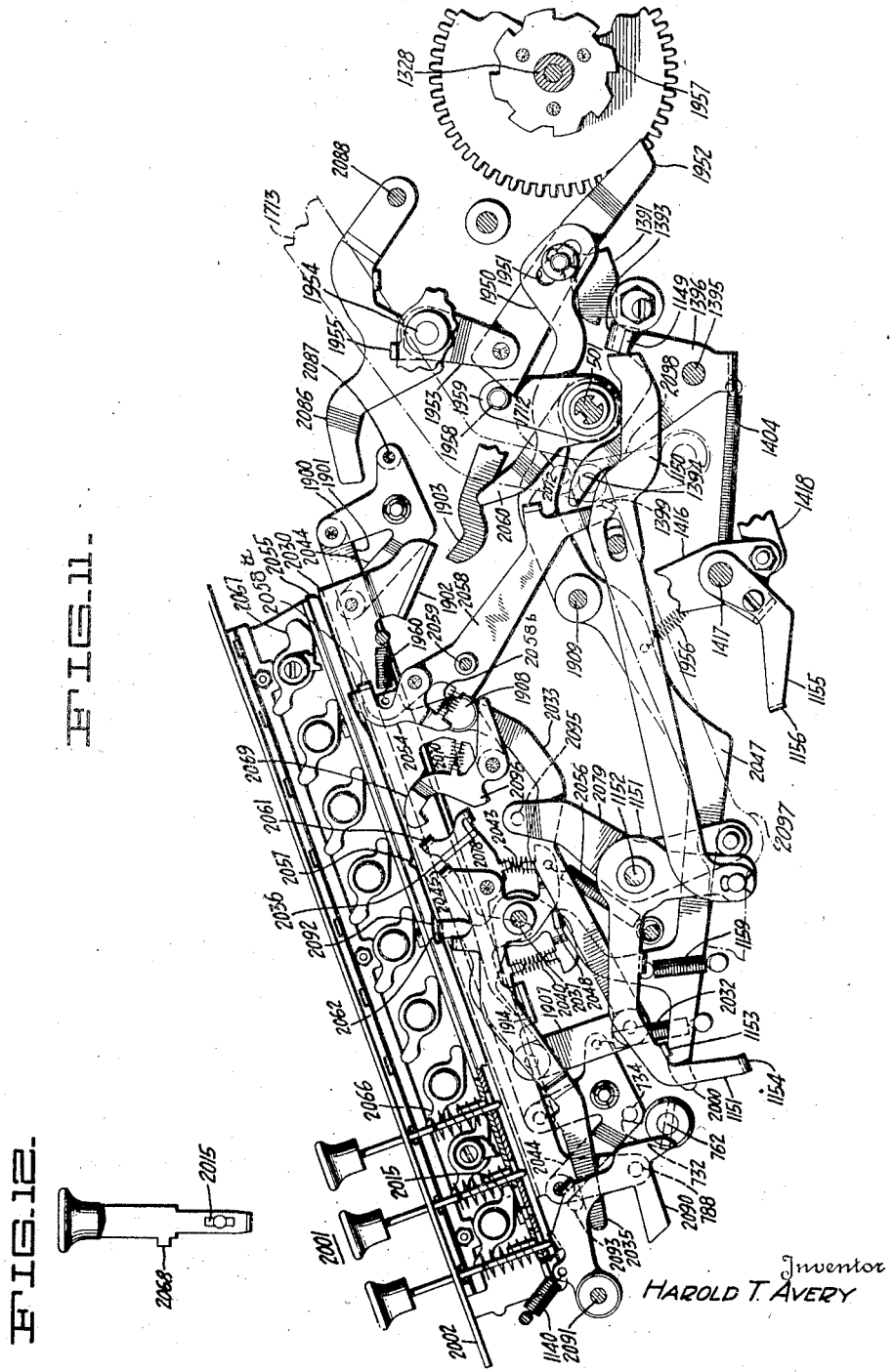

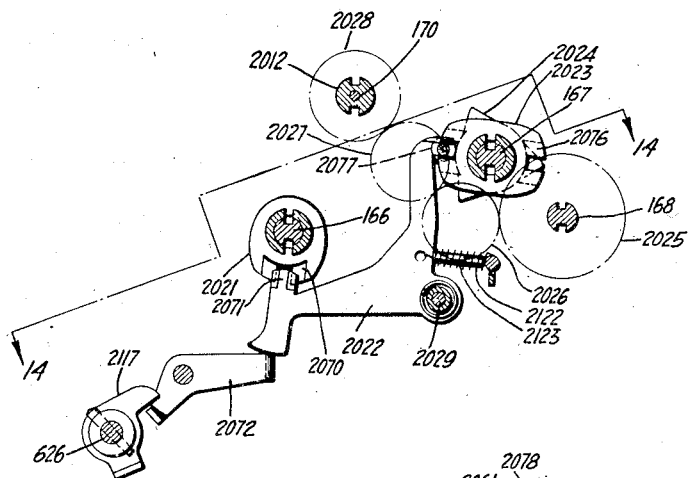
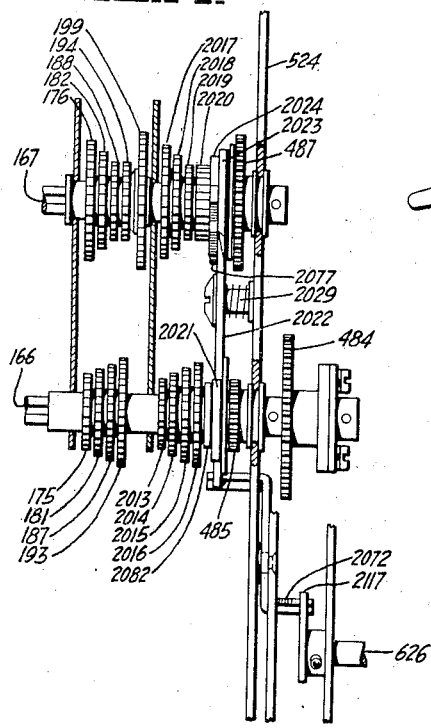
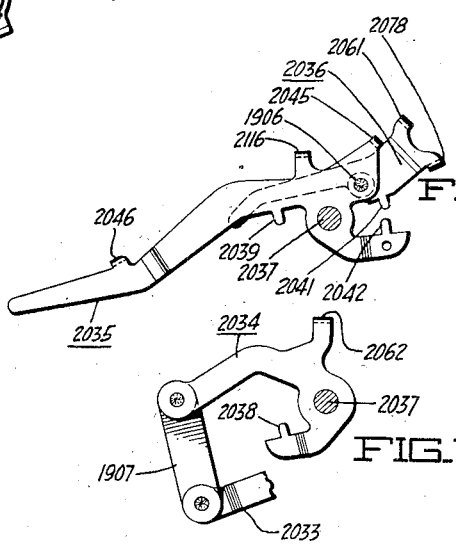

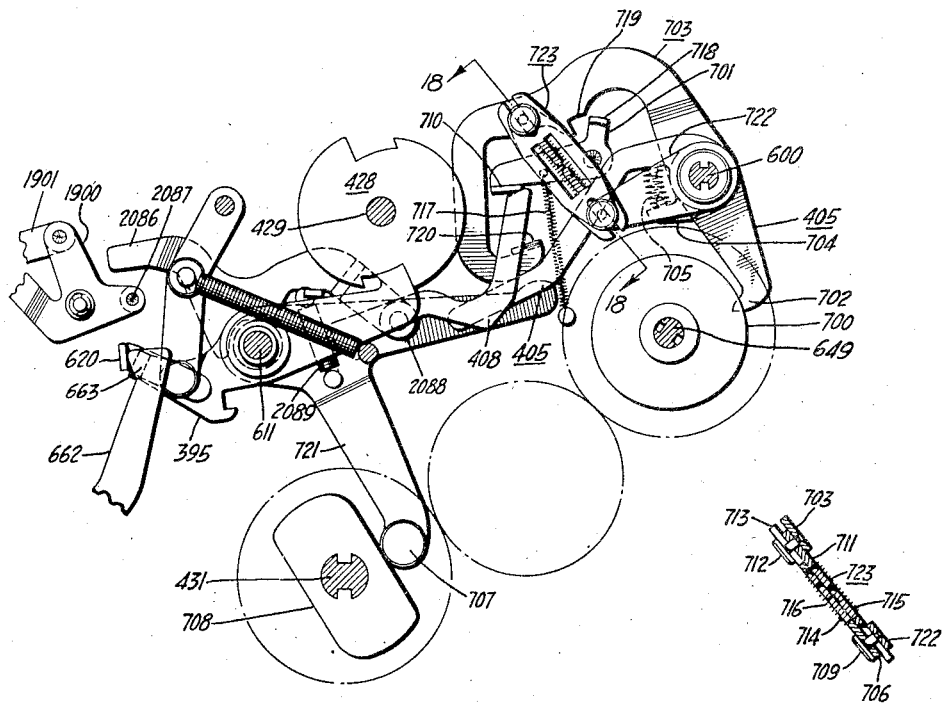

Jan. 2, 1945. H. T. AVERY 2,366,429
CARRIAGE SHIFT CONTROL MECHANISM
Filed Aug. 12, 1940 14 Sheets-Sheet 9

Inventor
HAROLD T. AVERY
By
Attorney

Jan. 2, 1945. H. T. AVERY 2,366,429
CARRIAGE SHIFT CONTROL MECHANISM
Filed Aug. 12, 1940 14 Sheets-Sheet 10
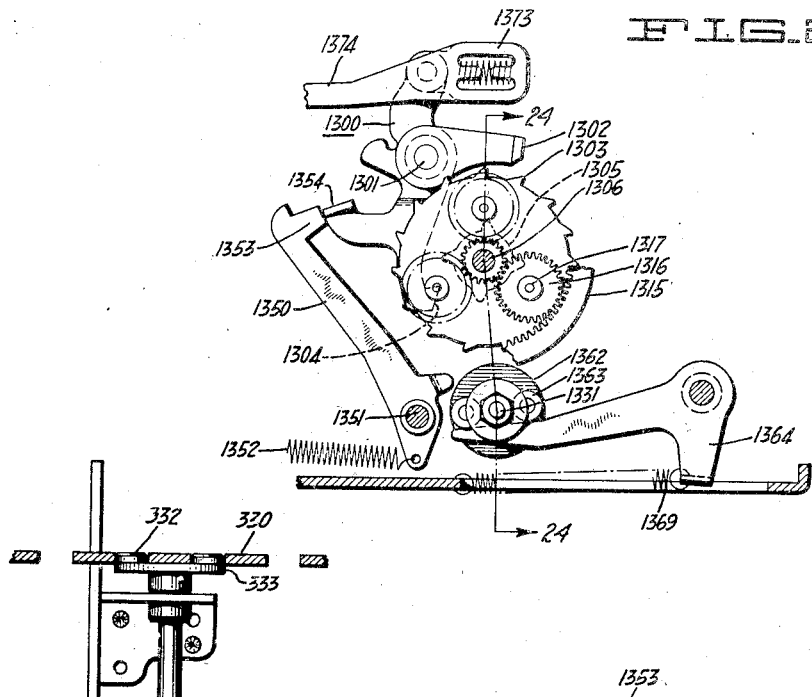
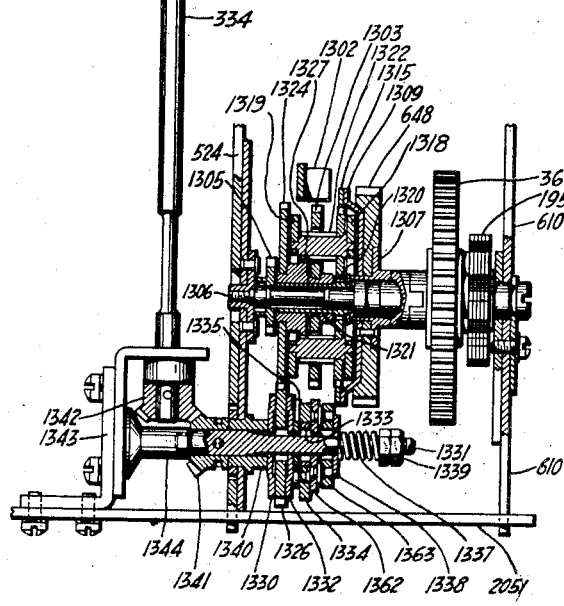
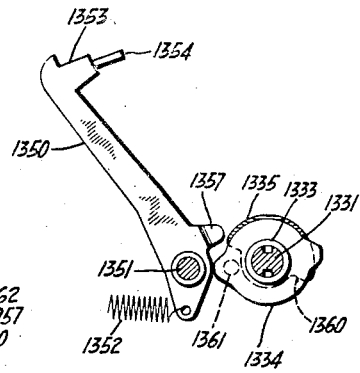
Inventor
HAROLD T. AVERY Jan. 2, 1945.    H. T. AVERY    2,366,429
CARRIAGE SHIFT CONTROL MECHANISM
Filed Aug. 12, 1940    14 Sheets-Sheet 11
FIG. 26.
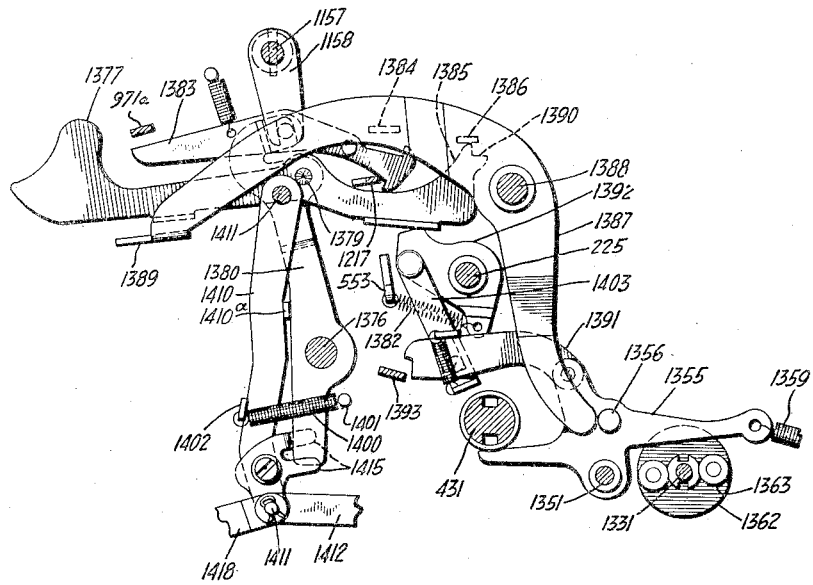
FIG. 27.
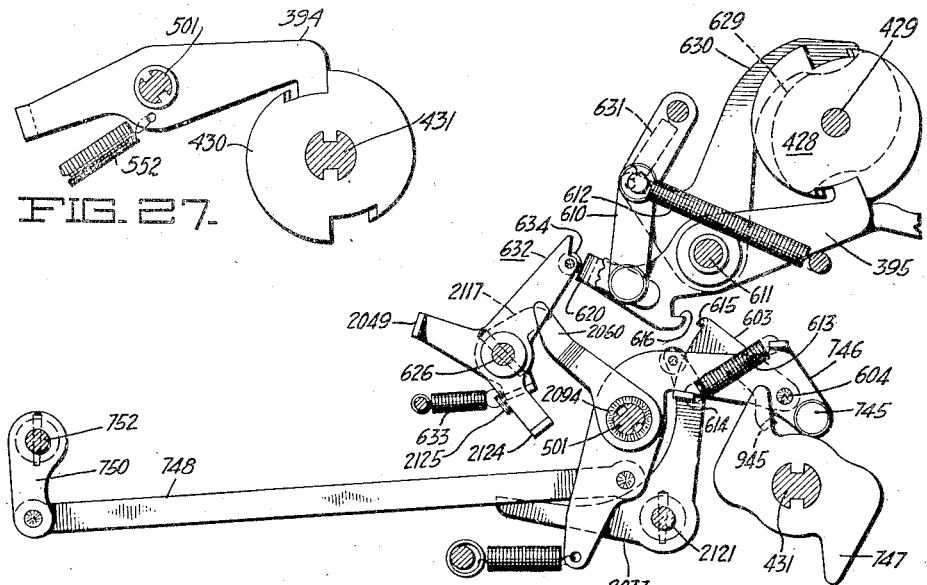
FIG. 28.
Inventor
HAROLD T. AVERY
By
Attorney Jan. 2, 1945.  H. T. AVERY  2,366,429
CARRIAGE SHIFT CONTROL MECHANISM
Filed Aug. 12, 1940  14 Sheets-Sheet 12

Inventor
HAROLD T. AVERY
By
Attorney

Jan. 2, 1945.   H. T. AVERY   2,366,429
CARRIAGE SHIFT CONTROL MECHANISM
Filed Aug. 12, 1940   14 Sheets-Sheet 13

INVENTOR.
HAROLD T. AVERY
BY
ATTORNEY.

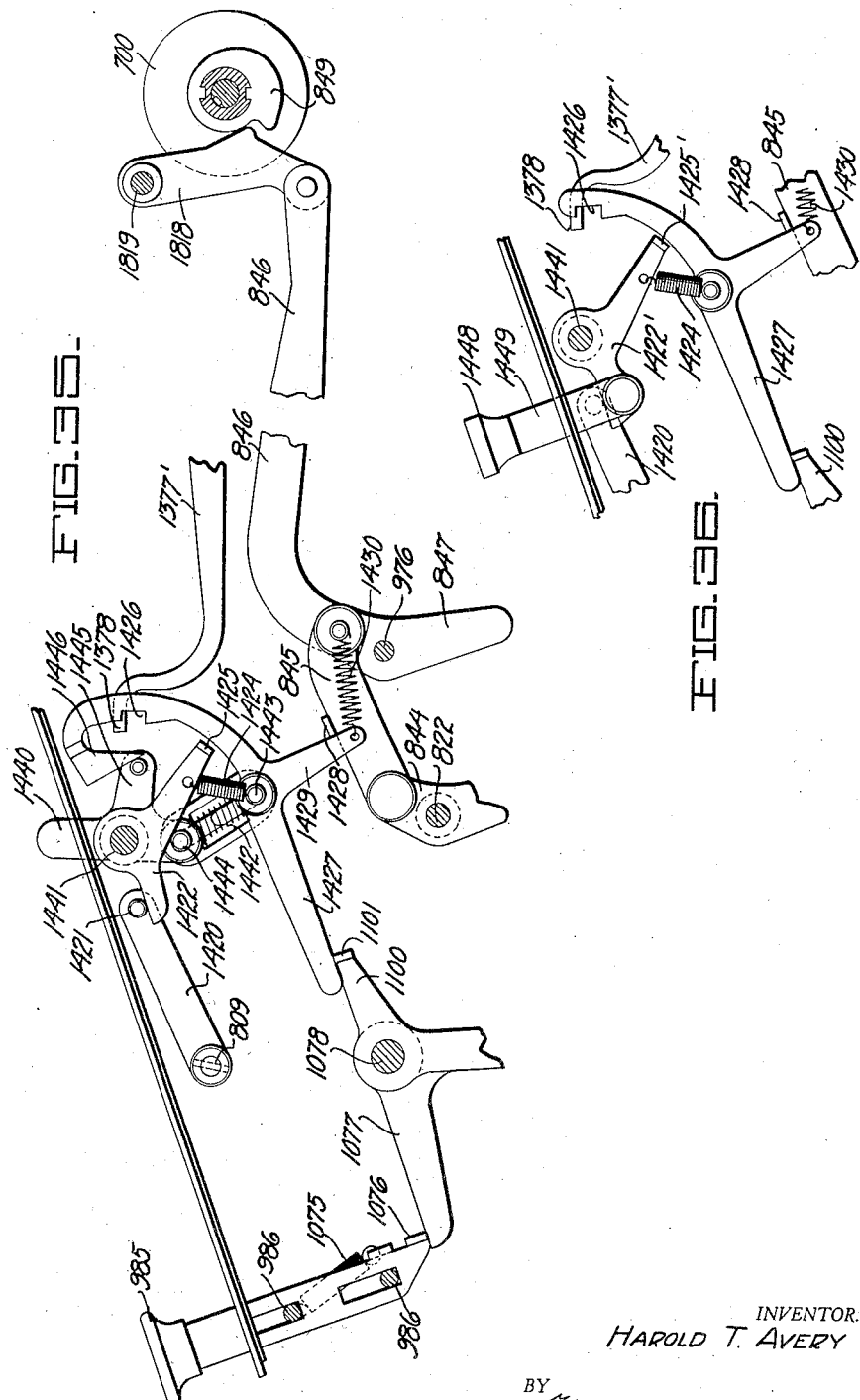

Patented Jan. 2, 1945

2,366,429

UNITED STATES PATENT OFFICE 2,366,429

CARRIAGE SHIFT CONTROL MECHANISM

Harold T. Avery, Oakland, Calif., assignor to Marchant Calculating Machine Company, a corporation of California Application August 12, 1940, Serial No. 352,289

11 Claims. (Cl. 235—63)

This invention relates to calculating machines and the like having carriages which may be automatically shifted during certain operations, such as multiplication and division, and has particular reference to means for controlling the shifting mechanism for a carriage of a machine of this class.

The general object of the present invention is to reduce the number of manual operations required to condition a calculating machine to perform a calculation.

A more specific object is to automatically control the carriage shifting mechanism of a calculating machine in accordance with the type of calculations performed thereby.

Another object is to selectively control the direction of carriage shift during one type of machine calculation and to automatically render such control ineffective during a different type of machine calculation.

Another object is to automatically render the shift controlling mechanism ineffective during additive or subtractive operation.

Another object is to selectively predetermine the direction of automatic carriage shift during a machine calculation or to render the carriage shift ineffective.

The present invention is disclosed herein in its preferred form as embodied in the commercially known "Marchant" calculating machine of the type shown in the copending Avery Patent 2,271,240 issued on January 27, 1942, of which the present application is a continuation-in-part. This application is also a continuation-in-part of the copending Avery application Serial Number 702,949, filed December 18, 1933, and since matured into Patent Number 2,211,736, issued August 13, 1940.

Reference may be had to the above mentioned patents for a complete disclosure of the present calculating machine including mechanism not specifically disclosed herein; it being noted that parts shown herein to which reference numerals are applied, but which are not described in detail, will be found to bear the same reference numerals in said patents. It is to be understood, however, that the invention is not to be regarded as limited in application to machines or mechanisms of the type set forth in the above mentioned patents. For example, although the invention is shown as applied to a machine in which a shiftable carriage supports the accumulator and counter registers for movement relative to actuating mechanism therefor, the invention may also be useful in calculating machines wherein the registers are stationary and the actuating mechanism is shiftable relative to the registers.

With a calculating machine embodying the present invention, it is possible to reduce the amount of time and effort on the part of the operator in conditioning the machine for a problem. Thus, if the machine is set to effect an automatic carriage shift in a certain direction, or to prevent such automatic shift during multiplication, manipulation of the division controls to effect division will automatically supersede such shift or non-shift control so as to render the same ineffective, and effect carriage shifting in the direction required in performing the division operation. After the division operation is completed, the former shift or non-shift control will be automatically reenabled.

Also, if the calculating machine is set to control a carriage shift in a certain direction automatically in multiplication, this control may be rendered ineffective during single or multicycle addition or subtraction operations upon the manipulation of the proper controls for effecting such operation.

Further examples of the advantages and time saving features of the invention, as well as the manner in which the above and other objects of the invention are accomplished, will be readily seen on reference to the following specification when read in conjunction with the accompanying drawings, wherein—

Figure 2 is a sectional view in side elevation of the calculating machine.

Figure 3 is a section taken along the line 3—3 of Figure 2 showing the typical construction and mounting of the keys.

Figure 8 is a vertical sectional view through the multiplier unit, illustrating the multiplier selection mechanism.

Figure 9 is a detail view of the selection segment illustrated in Figure 8.

Figure 10 is a sectional view taken on line 10—10 of Figure 8.

Figure 11 is a vertical sectional view of the multiplier unit.

Figure 12 is a detailed view of one of the multiplier keys.

Figure 13 is a sectional view illustrating mechanism for automatically controlling the termination of the multi-cyclic operation initiated by one of the multiplier keys.

Figure 14 is a sectional view taken on the line 14—14 of Figure 13.

Figures 15 and 16 illustrate details of construction of certain levers shown in Figure 11.

Figure 17 is a sectional view showing the restore clutch and mechanism for controlling this clutch.

Figure 18 is a section taken on line 18—18 in Figure 17.

Figure 23 is a sectional side elevational view showing certain of the mechanism utilized for effecting a power shift of the carriage.

Figure 24 is a sectional view taken substantially on line 24—24 of Figure 23.

Figure 25 is a detail view of part of the shift controlling mechanism.

Figure 26 is a sectional side view illustrating part of the mechanism for automatically controlling the carriage shifting mechanism.

Figure 27 is a detailed sectional view of the setting clutch and control member therefor.

Figure 28 is a sectional view of part of the mechanism for controlling operation of the main clutch and for effecting release of the keyboard.

Figure 35 is a sectional view of a modified form of shift and non-shift control for the carriage.

Figure 36 illustrates still another modified form of shift control for the carriage.

*Manually set selection mechanism*

The present invention is disclosed as embodied in a machine of the key-set type in which means are provided for first setting one factor of a calculation upon a keyboard and subsequently operating the machine in a manner indicated by the character and amount of another factor of the calculation.

Figure 1:
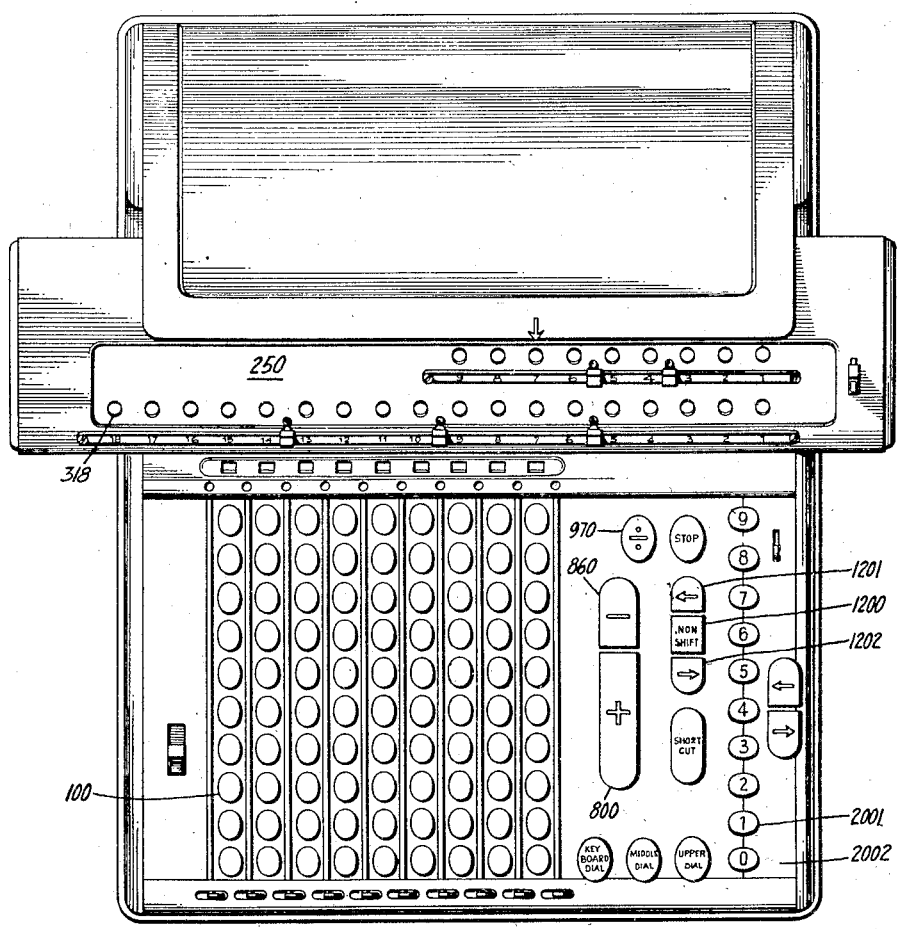
Figure 1 is a plan view of a calculating machine embodying the present invention and showing the location of the various controls therefor.

As viewed in Figure 1, the various value selecting keys 100 are arranged in a series of parallel banks of nine keys each, the number of such banks provided depending upon the magnitude of the factors with which the machine is designed to deal. Each key bank comprises a channel shaped key frame 101 (Figures 2 and 3) in which the key stems 103 of the various keys 100 are slidably mounted. Compression springs 102 are provided to normally maintain all of the keys 100 in a raised position.

All of the key stems 103 are of the same length and each has a cam extrusion 116 which, upon depression of the associated key, pushes to the right, as viewed in Figure 2, a slotted key locking slide 117 slidably supported on the lower side of the channel 101 by rivets, thereby releasing any other latched down key in the same key section. Upon depression of any value key stem, the slide 117 is returned to its initial location by spring 118, and by overlapping the upper end of the extrusion 116, latches the depressed key.

Disposed beneath the value keys 100 in each bank is a differentially settable bar 120 (Figure 2) which is pivotally suspended from the key section frame 101 by means of two parallel links 128 and 129. This bar 120 has nine identical divergent notches 130, each of which terminates in a rectangular slot 131 proportioned to receive the end of the associate key stem 103 so that the bar 120 will be accurately positioned. The key stems 103 are spaced an equal distance apart and this distance is slightly greater than the spacing between successive slots 131 so that each succeeding slot 131 will be spaced one increment further away from its cooperating key stem. Thus depression of a value key will cam the bar 120 to the right a number of increments equal to the value represented by the depressed key.

Such movement of each of the bars 120 is utilized to set up a mechanical representation of the selected value to control the actuating mechanism accordingly, and for this purpose a swinging segment member 132 is connected by means of a pin and slot connection 163 to each bar 120, and is pivotally mounted on a common shaft 137 extending across the machine and supporting like members associated with other key banks. Each of the segment members 132 is provided at opposite ends thereof with arcuate racks 138 and 139, which serve to transmit the movement of the differential bar 120 respectively, to a pinion 145 of a check dial assembly 140 rotatably mounted on a shaft 141, and through a gear 151 to a cam unit 146 which is positioned by such movement to form a mechanical representation of the value set up on the selected key bank.

Each cam unit 146 comprises a gear 151 and five cams, one of which is shown at 152. Each one of the cams has two high points 160 and two low points 161 on its periphery. The cams are so staggered that no high or low point on one cam is aligned with a high or low point on another cam.

As is described in detail in the above mentioned Avery Patent 2,271,240, the various cams on the cam unit 146 are so arranged that upon depression of a value key 100, the gear 151 meshing with the arcuate rack 139 will rotate the cam unit 146 to a position wherein one of the high points of one of the cams will be positioned in the path of a nose 211 of one of a set of five feeler arms 210 on one side of the cam unit 146, or in the path of a nose 219 of one of a set of five feeler arms 217 on the opposite side of the unit 146.

*Power set selection mechanism*

After the setting of the mechanism heretofore described has been completed and upon manipulation of one of the operation control keys, the power operated portion of the machine is brought into operation and acts under the control of the cam units 146 to effect entry of a value set up on the keyboard into the accumulator register supported by the transversely shiftable carriage 250.

Upon depression of one of the operation control keys illustrated in Figure 1, such as the add bar 800, the subtract bar 860, the division key 970, or one of a plurality of multiplication control keys 2001, a setting clutch dog 394 (Figure 27) is rocked counter-clockwise by mechanism to be described hereinafter to effect engagement of a cyclically operable setting clutch 430, the details of which are disclosed in the above mentioned Avery patents. Upon engagement of the setting clutch 430, power derived from a motor (not shown) is transmitted through the clutch to a setting clutch shaft 431 (see also Figure 2).

Keyed on the setting shaft 431 are a number of pairs of complementary cams identical to cams 220 and 221 (Figure 2), and each pair has an associated cam follower 224, pivoted on a cross rod 225, and provided with a roller 222 in engagement with the cam 220 and a second roller 223 in engagement with the cam 221. As the shaft 431 rotates, the cam followers 224 are rocked in a clockwise direction and, through links 226, impart a counter-clockwise rocking movement to a series of levers 214 rockably mounted on a shaft 215.

A shaft 213 supported by the lever 214 has pivotally mounted thereon the groups of feeler arms 210 hereinbefore described, one of these groups being located adjacent each of the cam units 146. During the leftward movement of the feeler arms 210 by the shaft 213, each of the noses 211, formed on the feeler arms 210, engages the periphery of the respective cam on the cam unit 146, thereby causing each feeler arm 210 to pivot about the point of contact between its respective nose and the periphery of its associated cam. The balance of the forward movement of the shaft 213 by the cam followers 224 effects forward movement of the lower end of the feeler arms 210 and this movement is transmitted through a link 216 to rock a second feeler arm 217 aligned with each of the feeler arms 210. The arms 217 rock in a clockwise direction about a fixed shaft 218 until their noses 219 engage the periphery of the respective cam at a point substantially diametrically opposite to that engaged by the nose 211 of the associated feeler arm 210.

As was described hereinbefore, each of the cam units 146 is so arranged that only one of the associated pairs of feeler arms 210 and 217 will have their respective noses in engagement with the high or low points of a cam at any one setting of the value keys 100 in the respective key section. Thus, one of the feeler arms 210 will be rocked a considerable angle about its supporting shaft 213 to one side or the other of a medial position, indicated in Figure 2, depending upon whether its nose 211 is in engagement with a high point 160 or a low point 161 of its respective cam. All of the other cam units will, since their noses are held the same distance apart from the cam supporting shaft 159 by the remaining cams, be held in their respective medial position causing their upper slotted ends to assume a position substantially as shown in Figure 2.

Each of the feeler arms 210 is connected through a pin and slot connection 206 with a plate 172 pivoted on a sleeve 169 which is rotatable about a shaft 170. Arranged on each plate 172 is a set of gears 174 and 173, meshing with a laminated gear 189 mounted on the sleeve 169.

From the above it will be seen that four of each group of five of the selection plates 172 will be held in a medial position, while the fifth will be moved forward or rearward until the lowermost gear 173 thereon meshes with an aligned gear 175 on a shaft 166 or an aligned gear 176 on a shaft 167.

Figure 34:
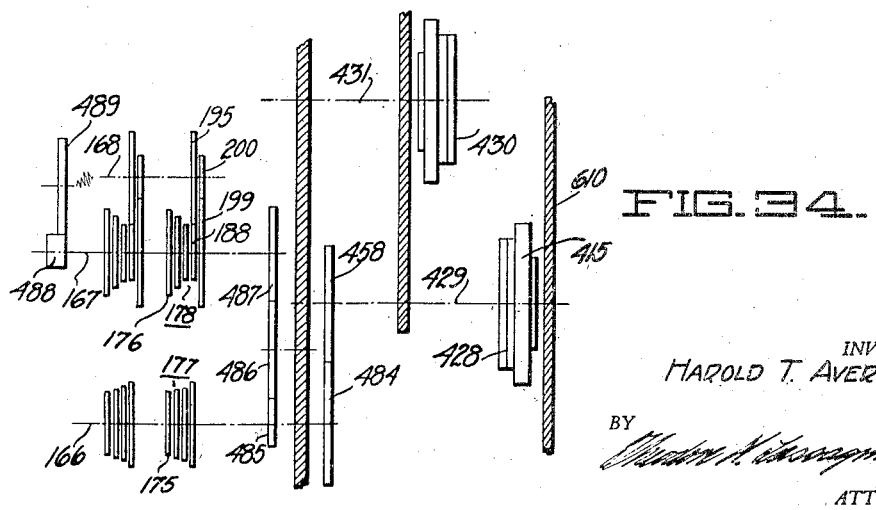
Figure 34 is a schematic developed view showing the relationship between various units of the calculating machine.

Gear 175 is one of a group of four gears 177 (Figure 34) keyed on the shaft 166 and adapted to mesh with gears on four of the selection plates 172. Likewise, gear 176 forms one of a group of five gears 178 mounted on the shaft 167 and adapted to enmesh with aligned gears 173 on the five selection plates 172. The three leftmost gears of this latter group are keyed to the shaft 167, while the two rightmost gears 188 and 199 are free on the shaft 167 and mesh with gears 195 and 200, respectively, keyed on a third shaft 168.

The shafts 166, 167, and 168 are connected to a cyclically operable main clutch 428 (Figures 28 and 34) in a manner to be described presently, so that the shaft 166 rotates through a 180° for each cycle of operation of the clutch 428, and shaft 167 rotates through 90° for each cycle of the main clutch, while shaft 168 moves through 30° for each cycle of the main clutch. The diameters of the various gears in the two gear groups 177 and 178, corresponding to each keyboard order, are so arranged that for each machine cycle, the gear 189 (Figure 2) will be rotated by one of the gears of the group 177 and 178, a number of increments corresponding to the value of the key 100 which is depressed during the machine cycle. If no key is depressed, the selection plates 172 will be so arranged that none of the gears in either of the groups 177 and 178 will become operative to drive the gears 173.

Means are provided for locking the selection plates 172 in any of their three operative positions and comprises a lock bail 236 (Figure 2) which extends across all orders of the machine and is pivoted at 237. This bail is connected by means of a link 528 to a cam follower 529 having rollers 530 and 531 thereon in engagement with complementary cams 526 and 527, respectively, secured to the setting shaft 431.

*Carriage dipping*

At the start of a machine cycle, and in advance of rotation of the gears 189, a gear 271 (Figures 2 and 4) having a gear 273 of the accumulator register mechanism in mesh therewith, is dipped under control of the setting shaft 431 to mesh with the gears 189 and thereby transmit rotation to numeral dials in the accumulator register which dials are visible through openings 318 in the cover of the carriage 250. Suitable tens carrying mechanism (not shown) is provided as disclosed in detail in the above mentioned Avery Patent 2,271,240.

Figure 4:
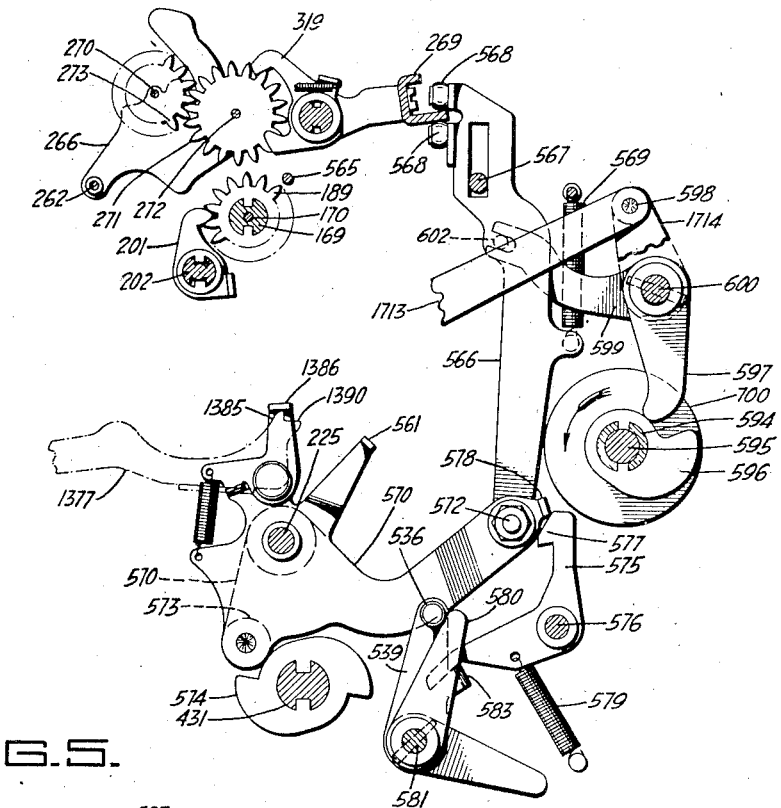
Figure 4 is a side elevation illustrating the mechanism for controlling the dipping of a portion of the shiftable carriage.

As shown in Figure 4, the shafts 270 and 272 supporting the gears 273 and 271, respectively, are mounted on a series of plates 266 pivoted on a cross rod 262 carried by carriage support plates (not shown) and are secured at their rightmost ends, as viewed in Figure 4, to a common bail 269 which extends between rollers 568 mounted on vertically extending links 566. These links are slidable over pins 567 and are biased upwardly by a tension spring 569. These links 566 are hinged to cam levers 570 by pins 572, which levers carry rollers 573 in engagement with cams 574 on the setting shaft 431 so that the links 566 are positively pulled down by the setting clutch rotation to engage the gears 271 with the gears 189.

Figure 5:
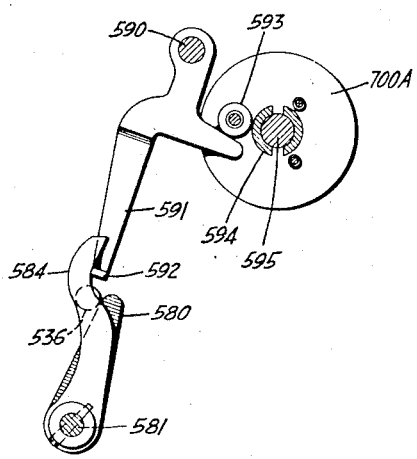
Figure 5 is a sectional view illustrating mechanism for effecting release of the dipping portion of the carriage from its dipped position.

After the above mentioned portion of the carriage 250, including the gears 271 and 273 is dipped, it is locked in this position by latches 575 pivoted at 576 and each having a nose 577 formed at the upper end thereof to engage ears 578 on the cam levers 570. Springs 579 urge the latches into engagement with the ears 578. Means are provided to release the dipped portion of the carriage at the end of a main clutch operation and comprises levers 580 and 584 (Figure 4 and 5) secured to a shaft 581 and cooperating with a lever 591 pivotally mounted on a shaft 590 and provided with an extension 592 lying against the lever 584. A second extension of lever 591 is adapted to be engaged by a roller 593 fixed to a supporting disc 700a secured on a sleeve 594 which is driven by a restore clutch 700 (Figures 4 and 17), the control of which will be described hereinafter.

A cam 596, also driven by the restore clutch 700, is provided to prevent the dipping portion of the carriage from rising too rapidly under the action of the tension spring 569. A cam follower 597 is fixed to a rockable shaft 600, which shaft has also affixed thereto arms 599 connected by pin and slot connections 602 to the vertical links 566. Thus, the rise of the link 566 is controlled by rotation of the restore clutch 700 under the action of the springs 569.

Main clutch operation

The main clutch 428 (Figures 28 and 34) is engaged upon operation of the setting clutch 430. Clutch 428 is driven from the motor (not shown) through suitable gearing entrained with a gear 415 mounted on the driven side of the clutch. The driving side of clutch 428 is connected to shafting 429 to which is secured a gear 458 meshing with a gear 484 mounted on the hereinbefore mentioned shaft 166. The shaft 167 is entrained with the shaft 166 through gears 485, 486, and 487, while the shaft 168 is entrained with the shaft 167 through gears 488 and 489.

The clutch 428 is controlled by a clutch dog 395 rockably mounted on a shaft 611 and urged into engagement with the clutch by a spring 612 tensioned between a frame stud and the left end of the dog 395 through a toggle link arrangement 610.

To effect rocking of the clutch dog 395 by the setting shaft 431 a cam 747 is mounted on the setting shaft and is engaged by a roller 745 mounted on a cam follower 746 fulcrumed on a shaft 501. This cam follower 746 carries a member 603 pivoted thereon at 604 and urged to rock clockwise with respect to member 746 by a spring 613, movement between the lever and the member 603 being limited by an ear 614 on the member 603 engaging the lower edge of the cam follower 746. The member 603 is provided with a nose 615 which may engage a notch 616 on the clutch dog 395 with a hooking action to rock the dog 395 out of engagement with the main clutch 428 to cause operation thereof.

To provide for continuous multi-cycle rotation of the main clutch 428 for multiplication or multiple addition and subtraction operations, a latch 632 is provided, this latch being pinned to a rockable shaft 626 and urged clockwise by a spring 633. A roller 634 is mounted on the upper end of the latch 632 and is adapted to be engaged under a lateral projection 620 on the main clutch dog 395 to hold the same out of engagement with the clutch during multi-cyclic operation. However, for operation performed during one cycle of the main clutch, such as addition, subtraction, and multiplication by the number "1" as a multiplier, means hereinafter described are provided to prevent the latch 632 from entering under the tail of the clutch dog 395.

Restore clutch

The restore clutch 700 (Figure 17) is employed to effect release of the heretofore mentioned carriage latch member 575 (Figure 4) and to control the rate of return of the dipping portion of the carriage from its dipped position, as well as to effect other functions to be described hereinafter. This clutch is jointly controlled by dipping of the carriage and by the main clutch dog 395 in such a way that whenever the carriage is in its lowered position and the main clutch dog 395 is seated home in a notch in the main clutch, the restore clutch will operate and complete one cycle of operation.

The lowering of the carriage creates a spring bias tending to move a clutch release dog 405 away from the restore clutch and permit engagement of the clutch, but as this dog is normally latched by a member 701 the spring is prevented from becoming effective until completion of the main clutch cycle. The raising of the carriage is initiated and controlled by the restore clutch and this carriage movement is utilized to reverse the spring bias on the restore clutch release dog so as to tend to return it home so that as the restore clutch cycle is finished the clutch release dog is spring pressed into the full cycle notch of the clutch housing bringing the restore clutch to rest upon completion of one cycle of operation.

The restore clutch 700 is similar to that disclosed in the patent to Friden U. S. Patent Number 1,643,710 and is controlled by a nose 702 on a clutch release dog 405 which is pivotally supported on the shaft 600.

An M-shaped member 703, rockably mounted on the shaft 600, is provided to control the dog 405 and has a lug 704 thereon supporting a spring 705 which is compressed between the lug 704 and an arm formed on the dog 405.

An arm 722 is keyed to the shaft 600 and is consequently rocked by dipping movement of the carriage. This arm is resiliently connected to the M-shaped member 703 by a link unit 723 (Figures 17 and 18). As appears in Figure 18, the link unit includes a link member 706 secured by a pin 709 to the arm 722, and another link 711 secured by pin 712 to the M-shaped member 703, the other end of each link being slotted as at 713 to receive the pins 709 and 712, respectively. Each link has a cut-out portion into which tenons 714 and 715 extend. A compression spring 716 is slipped over the adjacent tenons in each link so that when the unit is pulled apart the spring is compressed, while likewise when the unit is compressed the spring is also compressed so that the spring tends to maintain the link unit at a given and constant length at all times.

As the setting clutch rotates, the main clutch dog 395 is withdrawn from contact with the main clutch and an extension 408 on said dog is withdrawn from beneath a latch member 701 pivoted on a frame plate, thus permitting said latch member to be rocked counter-clockwise by its spring 717 tensioned between one end thereof and the frame. An ear 718 on said latch member is thereby brought into the notch 719 of the M-shaped member 703 to prevent counter-clockwise movement of 703 until the main clutch has been disengaged by reseating of its dog 395 in one of the full cycle notches of the clutch 428.

The lowering of the dipping carriage, however, tends to engage the restore clutch even before the main clutch engages, and a second restraining means is provided to prevent such operation.

The left foot of M-member 703 is provided with a shelf 720 overlying one end of a bell crank 721 which is rockably supported on a shaft 611. The other end of bell crank 721 is provided with a roller 707 lying against the periphery of a cam 708 on the setting clutch shaft 431. On rotation of the setting clutch, therefore, the bell crank 721 is rocked and shelf 720 is raised by the end of the bell crank to rock the M-shaped member 703 slightly clockwise about the shaft 600. This raising of the member 703 insures that the lug 718 of the latch member 701 will engage in the notch 719 properly when the main clutch is engaged.

As the setting clutch continues to rotate, the dipping carriage is lowered and shaft 600 is rocked counter-clockwise by arms 599 (see also Figure 4) keyed thereto and connected with the carriage lowering links 566. Arm 722 (Figure 17) keyed to the shaft 600, is thus lowered, and since the M-shaped member 703 is held first by the bell crank 721 and then by the latch member 701, the link unit 723 is lengthened and its spring 716 compressed.

The parts remain so positioned until the main clutch dog 395 is permitted to reseat in the notches of the clutch discs, whereupon the extension 408 thereof strikes the ear 710 of the latch member 701, rocking it clockwise and removing its lug 718 from the notch 719 of member 703. Spring 716 is then permitted to expand, shortening the link unit 723 and rocking the member 703 counter-clockwise to carry the left leg of member 703, as viewed in Figure 4, down against the leftwardly extending arm of bell crank 405 and move the restore clutch dog 702 to cause engagement of the clutch.

Operation of the restore clutch thus initiated, causes the dipping carriage to rise, as previously described, rocking arm 722 clockwise by virtue of its connection therewith. Movement of the arm 722 is, in this operation, transmitted directly through the link unit 723 to rock member 703 clockwise, and to compress spring 705 until the dog 702 of the bell crank 405 can reenter the aperture of the housing to disengage the clutch, whereupon the mechanisms are brought to rest in the position shown in Figure 17.

*Addition bar mechanism*

The addition bar 800 is ordinarily used for securing a single additive operation, but may be used for multiple addition also as hereinafter disclosed. The bar 800 is capable, upon depression, of initiating operation of the motor, the setting clutch 430, the main clutch 428, release of all depressed value selecting keys 100 (Figures 1 and 2), and release of the automatic carriage shift control.

Figure 19:
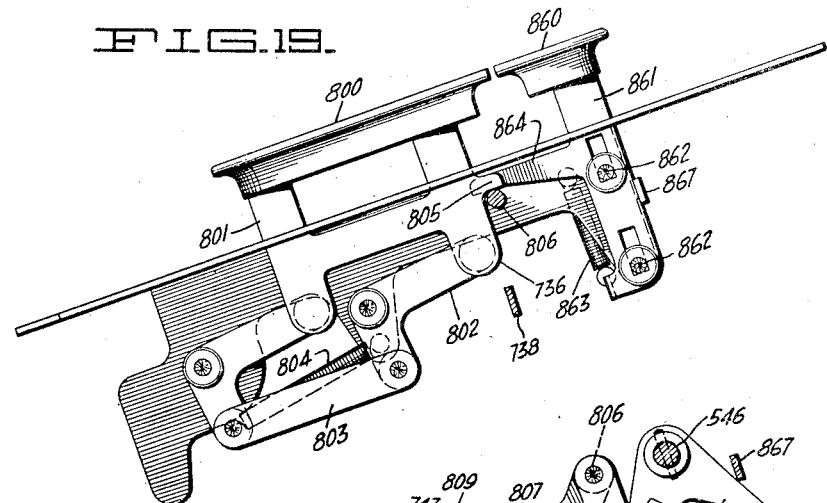
Figure 19 is a side view illustrating the construction of the support for the addition and subtraction bars.

The addition bar 800 (Figure 19) is carried by a frame 801 which is supported by parallel link mechanism formed by bell cranks 802, both pivoted upon the machine frame. These bell cranks are connected together by a link 803. A spring 804 is tensioned between one of the bell cranks and the frame of the machine to hold the addition bar 800 in a raised position. The frame 801 includes a projection 805 overlying a pin 806 carried by another parallel link arrangement (Figure 20) comprising arms 807 and 808 pivoted on studs 809 and 810, and connected together by a link 811.

Upon clockwise rocking of the levers 807 and 808 by depression of the bar 800, a shelf 726 formed on the lever 808 is moved upwardly out of engagement with the face of a hatchet shaped lever 728. This lever 728 (Figures 20 and 21) is pinned to a shaft 762, as is a second lever 760. A spring 730 is connected to the latter lever and rocks that lever, shaft 762 and lever 728 clockwise when the last mentioned lever is released from restraint of shelf 726. A short arm 732 is likewise pinned to the shaft 762 and therefor, swings with the lever 728 to move a pin 734 (see also Figure 11) to open the setting clutch and effect an additive operation through mechanism to be described in connection with multiplication.

Figure 20:
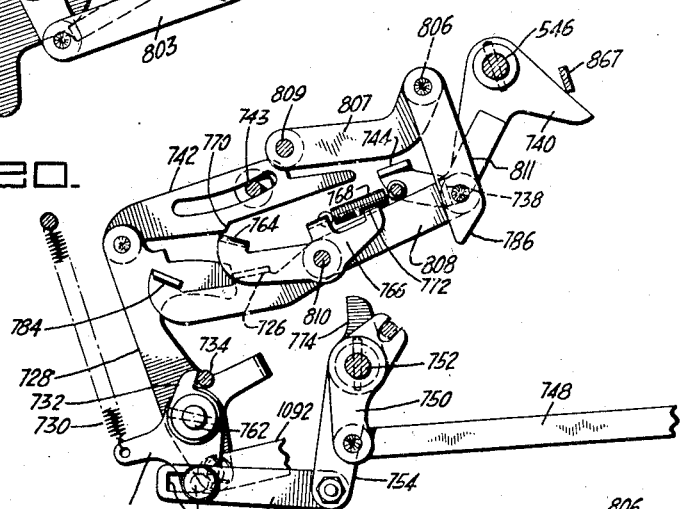
Figure 20 is a sectional view illustrating mechanism operated by the addition and subtraction bars.
Figure 21:
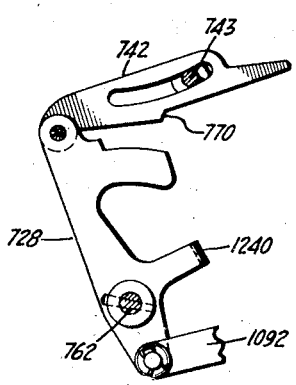
Figures 21 and 22 are detail views also showing mechanism operated by the addition and subtraction bars.
Figure 22:
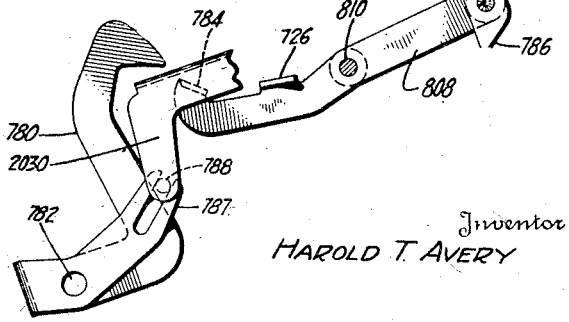

After having been released by the shelf 726, the hatchet shaped lever 728 is recocked by the cam 747 (Figure 28) on the setting clutch shaft 431, which cam rocks the hereinbefore mentioned cam follower 746 to which is connected a link 748. Link 748 is also connected to an arm 750 pinned to a shaft 752 (Figures 20 and 28). A lever 754 is also pinned to the shaft 752 and is connected by a link 756 through a pin and slot connection 758 with the lower end of the lever 760 which is pinned to the same shaft 762 to which the hatchet shaped lever 728 is pinned. The pin and slot connection 758 permits free clockwise movement of the hatchet shaped lever 728, but causes this lever to be rocked counter-clockwise or recocked upon rotation of the setting clutch 747.

The hatchet lever 728, upon being recocked, is carried slightly beyond its original position until a shelf 764 (Figure 20) on a pawl 766 pivoted on the shaft 810 and urged in a clockwise direction by a spring 768 engages with a shoulder 770 on the bottom edge of a link 742. Since the link 742 is connected with the upper end of the hatchet lever 728, this lever is held in its extreme counter-clockwise position until such time as the shelf 726 is permitted to return to its locking position relative to the hatchet shaped lever. Thus, in the event that the bar 800 is held depressed too long, the parallel links 807 and 808 will rise freely upon release of the bar 800 without any possibility of the shelf 726 being intercepted by the lever 728. As the lever 808 rises, its upper edge engages an ear 772 on the tail of the pawl 766, thus releasing the shelf 764 from the shoulder 770 and permitting the hatchet member to move to its original position where it is blocked by the shelf 726. Before the hatchet member is recocked this shelf 726 overrides its upper edge to form an interlock preventing rising of the parallel links 807 and 808 which might otherwise occur prematurely.

*Subtraction bar mechanism*

The subtraction bar 860 (Figures 1 and 19) is utilized for effecting a single cycle of negative operation or for repeated subtraction in connection with the multiplier keys 2001.

This bar 860 is mounted on a stem 861 slidable vertically on pins 862 and normally held in a raised position by a spring 863. The stem 861 is provided with a projection 864 which overlies the hereinbefore mentioned pin 806 and operates the mechanism associated with that pin in the same manner as was described in connection with the addition bar 800. However, depression of the subtraction bar 860 effects reverse control of a main reverse unit (not shown) situated between the main clutch 428 (Figure 34) and the gear 458. To effect reversal of this main reverse unit, a lug 867 (Figures 19 and 20) is formed on the stem 861 of the subtraction bar 860 and, upon depression of the bar, this lug engages an arm 740 pinned to a shaft 546, to which is also pinned the controls disclosed in detail in the aforesaid Avery patents, for the main reverse unit. The lug 867 cams the arm 740 in a clockwise direction to likewise rock the shaft 546.

*Keyboard release*

Figure 6:
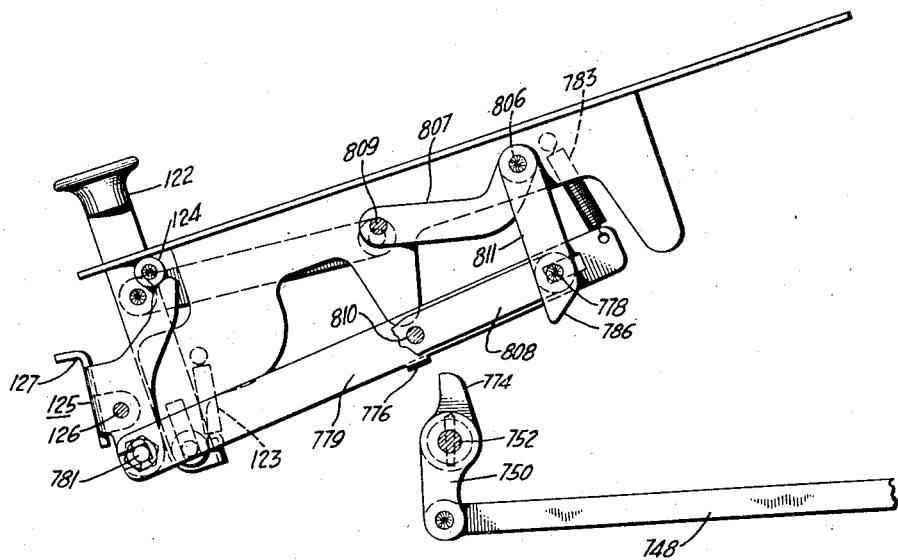
Figure 6 is a sectional view illustrating the mechanism for clearing the keyboard either manually or automatically.

Upon depression of either the bar 800 or 860 and consequent operation of the setting shaft, all depressed value selecting keys 100 will be automatically released by mechanism illustrated in Figures 6 and 20.

The hereinbefore mentioned parallel link arrangement comprising the levers 807 and 808 and link 811 comprises a pivot pin 778 which slidably supports one end of a link 779 which has a slot adjacent its right hand end and embracing this pin. The left hand end of the link 779 is bifurcated to embrace a pin 781 mounted on a keyboard clearing bail 125 extending across the machine. The bail 125 is pivoted at 126 and has an upwardly extending flange 127 located directly in front of the various key latching slides 117 (Figure 2). Whenever the bail 125 is rocked clockwise about its pivot 126, either by depression of a keyboard clear key 122 or by leftward movement of the link 779, as viewed in Figure 6, the flange 127 engages all of the slides 117 to move the same rearward and thereby release all latched down keys.

When the link 779 is lowered by depression of the addition bar 800, or subtraction bar 860, with consequent lowering of the parallel link arrangement comprising the levers 807 and 808, a lug 776 on the link 779 is lowered into the path of an arm 774 pinned to the shaft 752. As was described in connection with the addition bar mechanism, the shaft 752 is rocked counter-clockwise upon rotation of the setting shaft 431 by the mechanism illustrated in Figure 28, and the leftward movement of the link 779, as viewed in Figure 6, caused by this counter-clockwise rocking of the arm 774 effects rocking of the bail 125 and releases all depressed value selecting keys 100.

When the bars 800 and 860 are allowed to remain in their raised positions the lug 776 on the link 779 is retained by spring 783 above the path of movement of the arm 774.

*Automatic multiplier unit*

Automatic predetermined multiplication may be effected under control of a bank of multiplier keys 2001 (Figures 1, 8, 11, and 12) provided in a multiplier unit situated at the right hand side of the machine. This unit includes a key section 2002 similar to that disclosed in connection with Figure 2 for the value selecting keys 100.

The key section 2002 (Figure 8) includes a differentially settable bar 120 which is set by the multiplier keys "2" to "9" values to move the selection segment 132 mounted on the shaft 137 an amount proportional to the value of the multiplier key depressed. The machine being normally conditioned for a single cycle operation, no control of the multiplier selection by the "1" key is necessary. The segment 132 is substantially the same as the same member disclosed in Figure 2, except that it does not have the upper segment arm for setting a check dial.

The mechanism for swinging the member 132 is illustrated in Figures 8, 9, and 10. A lever 2003 is pivotally mounted on a shaft 2004 which extends to the left of the key section 2002. A pin 2005 connects the lower end of lever 2003 with the differentially settable bar 120 and on its upper end lever 2003 is secured by a pin 2006 to a lever arm 2007. This arm 2007, as appears in Figure 10, is integral with an arm 2063 welded to a bail member 2064 pivotally mounted on shaft 2004. One end of the bail member is extended to form another lever arm 2065 having a bifurcated end embracing pin 2008 mounted upon the multiplier selection segment 132. Thus, lever 2003 and the lever 2065 are in effect joined as a single lever to rock about the common axis of the shaft 2004 so that movement of the bar 120 will impart proportional movement to the selection segment 132.

As has been stated in connection with the manually set selection mechanism, the swinging member 132 is likewise effective to rotate a selection cam unit 146 similar to that described in connection with Figure 2.

The multiplier unit also includes sensing members 210 and 217 (Figure 8) which, in the same way as has been disclosed in connection with the earlier described power set selection mechanism, are effective to sense the setting of the present cam unit 146 and, when the locking bail 236 is released, to position the selection plates 172 cooperating with driven gears 2009 driving idlers 2010 which, in turn, drive gears 2011. The gears 2009 are keyed to a sleeve 2012 supported by shaft 170, and the sleeve 2012 is in turn driven by the twelfth speed shaft 168 (Figure 13) through a gear train including gear 2025 on the twelfth speed shaft 168, idler gear 2026, and idler gear 2027, and driving gear 2028 on the sleeve 2012.

Since the twelfth speed shaft is rotated whenever the main clutch is operating, the gears 2011 (Figure 8) are driven thereby through the idlers 2010 carried on the different selection plates 172. As has been developed in connection with the previously described power set selection mechanism, any one of the group of plates may be selectively moved to engage the gear 2011 carried thereby with gears which, in this case, are carried by sleeves rotatably mounted on the half and quarter speed shafts 166 and 167, respectively. Movement of these gears is utilized to control the number of cycles of operation of the main clutch and thereby effect a multiplication in all operations wherein the multiplier is two or more.

The driven sleeve rotatably mounted upon the half speed shaft 166 (Figure 14) carries gears 2013, 2014, 2015, and 2016 connected thereto as a unit. The driven sleeve rotatably mounted on the quarter speed shaft 167 carries gears 2017, 2018, and 2019 connected together as a unit. These gears are mounted upon the half and quarter speed shafts for the sake of convenience and are not connected thereto. The gear 2020 is also rotatably mounted upon the quarter speed shaft but is not connected to the sleeve carrying the gears 2017, 2018, and 2019. The ratio of these various gears to the gears driving them is such that gears 2013 to 2019, inclusive, respectively, provide selection ratios extending from a "nine" multiplier to a "three" multiplier, while the gear 2020 provides, in combination with other mechanism, the "two" selection.

Depending upon the selection which has been made, one of the plates 172 of the multiplier control unit is swung either to the right or to the left, as viewed in Figure 8, to engage one of the gears in the group 2013 to 2020, inclusive. The other three plates remain in that position shown in Figure 8, in which the gears 2011 are not meshed with any gear in the group 2013 to 2020, inclusive. If no selection has been made, or if a "one" selection has been made, all of the gears 2011 will remain out of mesh with the gears on the half and quarter speed shafts.

A single cam member 2021 (Figures 13 and 14) is attached to the sleeve carrying gears 2013 to 2016, inclusive, and, as will presently appear is adapted to rock a bell crank 2022 universally pivoted on the frame by means of a loose fitting pin and spring connection 2029 so as to open the main clutch and stop the machine as hereinafter described, after the cam member 2021 has made a single revolution in either a clockwise or a counterclockwise direction. Thus, for example, gear 2014, which is that providing for seven main clutch actuations and controls a positive or negative multiplication by the value "seven," makes one revolution while the main clutch is making seven revolutions. Since member 2021 is connected to the unit which includes gear 2014, it will likewise make one revolution and at the end of this revolution is effective to rock the bell crank 2022.

A double cam member 2023 (Figures 13 and 14) is included in the same unit with gears 2017, 2018, and 2019, and is effective upon half a revolution in either clockwise or counter-clockwise direction, to rock the same bell crank 2022. Thus, for example, gear 2018 is effective to control the multiplication, either positive or negative, by the value "four," the main clutch making four revolutions. During the four main clutch revolutions, gear 2018 and the member 2023 make but half a revolution, the direction depending upon positive or negative multiplication. At the end of this half revolution, the member 2023 is effective to rock the bell crank 2022. Gear 2020, providing for multiplication by the value "two," is connected to the triangular member 2024 adapted to cooperate with a roller 2077 on the upwardly extending arm of the bell crank 2022. This member is adapted, when gear 2020 is being driven, to rock the bell crank 2022 during the second cycle of main clutch operation.

Depression of any value key from "1" to "9," inclusive, in the multiplier unit is effective to cause engagement of the setting clutch 430 (Figure 27) and is also effective to initiate motor operation by closing a motor switch (not shown).

The multiplier unit includes a bar 2030 (Figure 11) which is in a position to be engaged by the key stem of any key from "1" to "9" values, inclusive, and is mounted for parallel movement by swinging levers 2044 pivotally connected to the opposite ends and pivotally supported by the machine framework. A spring 2032 connected between an extension of the forward lever 2044 and the frame urges these levers clockwise, thus normally maintaining the bar 2030 in a raised position. The levers 2044 carry extensions 1900 between which extensions is pivoted a stabilizer link 1901 to insure parallel movement of the bar 2030 upon depression of any of the various multiplier keys 2001.

The mechanism for opening the setting clutch upon depression of any multiplier key from "1" to "9" includes a link 2033 (Figure 11) which is pivoted at its right hand end at 1908 to an ear of the bar 2030, and is supported adjacent its left hand end by a link 1907 depending from a lever 2034, included in a lever system which comprises lever 2034, lever 2035, and lever 2036 (Figures 11, 15 and 16). The levers 2034 and 2035 are pivotally mounted upon a common pin 2037 supported by a depending portion of the key frame. The lever 2036 is pivoted at 1906 to the lever 2035. Levers 2034 and 2035 include, respectively, projections 2038 and 2039 between which a spring 2040 is compressed to urge the levers apart. Similarly, lever 2036 includes a projection 2041 while lever 2035 includes projection 2042, between which projections spring 2043 is compressed. A lug 2045 on lever 2035 limits the movement of lever 2036 and a lug 2116 on lever 2035 limits the movement of lever 2034 with respect thereto. Lever 2035 also includes an ear 2046 which lies beneath the bar 2030 and which is forced downwardly when the bar 2030 is depressed upon operation of a multiplier key. Depression of the "0" multiplier key also rocks lever 2035 downwardly by means of a lever 2090 which underlies the zero key stem, being pivoted at 2091, and carries a pin 2093 overlying the left end of lever 2035.

Setting clutch operation is initiated by lowering of the link 2033 (Figure 11) by means presently to be described. The link 2033 underlies an ear 2048 formed on an upwardly extending arm of a long lever 2047 pivoted at 1909 and urged to swing counter-clockwise about its pivot by a spring 1956. The lever 2047 has a rearwardly extending arm 1950 provided with a slot 1951 embracing a pin carried by a floating interponent 1952 which is supported at one end by an arm 1953 freely pivoted on a stud 1954 on the control plate, an ear 1955 being provided on the link 1953 to abut the top edge of the control plate to limit the clockwise swinging movement of the link.

When the link 2033 is lowered, it permits the lever 2047 to be swung counter-clockwise by its spring 1956, raising the interponent 1952 until it is struck by a ratchet wheel 1957 secured to the rotating shaft 1328 of the carriage shift mechanism, hereinafter to be described.

The ratchet 1957 will thereupon kick the interponent 1952 sharply to the left so that its opposite end strikes a stud 1958 on a lever 1959. The lever 1959 is keyed to shaft 501 (see also Figure 27) along with the setting clutch dog 394 so that such rocking movement of this lever will free the dog from the clutch.

The opposite ends of link 2033 are lowered by different means; but, as will presently appear, the leverages are so arranged that the lowering of either end alone will not permit the lever 2047 to rock counter-clockwise sufficiently to operate the setting clutch dog through the means described.

As a multiplier key of any value from "1" to "9" is depressed, the underlying parallel bar 2030 (Figure 11) is depressed lowering the right end of link 2033 which is connected thereto at 1908. The lever 2035, having ear 2046 (see also Figure 15) underlying bar 2030, is also rocked by this movement and compresses spring 2040, rocking lever 2034 slightly, and causing the lug 2062 engaging notch 2092 in the latch bar, to move the latch bar 2055 to the left until it abuts the lug 2015 of the moving key, arresting further movement of lever 2034 and causing spring 2040 to be further compressed. This movement is sufficient to carry notch 2057 out of the path of lug 2061. As the lug 2015 of the key is moved below latch bar 2055, spring 2040 is permitted to expand rocking lever 2034 to simultaneously bring the latch bar over the lug 2015 and lower the left end of link 2033 which is connected thereto by link 1907. Both ends of the link 2033 being now lowered, lever 2047 may be rocked sufficiently by its spring 1956 to cause engagement of the setting clutch. The latch bar 2055 holds the depressed key down and all other keys up until it is retracted.

In order to effect the release of the locked multiplier keys it is necessary to provide means which will be operated upon operation of either the setting clutch shaft 431 or the carriage shifting mechanism (Figures 23 and 24) to retract the latch bar 2055. In view of the fact that the operator may depress a second key before the machine has completed the operation initiated by the first key depressed, and may be pressing down upon a third key before the second is released, special adaptation of the latch bar operating means to the peculiar requirements of such operation is necessary.

Retracting of the bar 2055 to unlock the keys is effected by a lever 2058 (Figure 11) pivotally mounted at 2059 and adapted to receive a clockwise oscillation upon operation of either the setting clutch shaft or the carriage shifting mechanism. As the setting clutch shaft 431 (Figure 28) receives a half rotation (one cycle) at the commencement of a multiplication operation, cam 747 fixed thereon rocks the cam follower lever 746 journaled for rocking movement on shaft 501 by means of a sleeve 2094 to which there is also fixed an arm 2060 (see also Figure 11) adapted, upon such movement, to engage an ear 2072 on the lever 2058. During a carriage shifting operation, as will hereinafter appear, lever 1396 (Figure 11) receives a counter-clockwise oscillation, and this lever is provided with an arm 1394 adapted to engage a second ear 1399 on lever 2058.

Adjacent the upper end of lever 2058 there is pivoted thereto, an extension 2054 having a laterally formed portion engaging in a notch in latch bar 2055. A stiff spring 2053b compressed between the lever 2058 and its extension 2054 normally holds the extension against a stop 2058a formed on the lever, so that the lever and its extension ordinarily function as a unit. However, if lever 2058 receives an excessive stroke, the forward end of the slot in latch bar 2055 will be brought against the key stem and spring 2058b will then yield. Spring 1960 normally urges lever 2058 clockwise and prevents latch bar 2055 from drifting into locking position.

Means are also provided to prevent relocking of a key in depressed position in the event it is held down until after the releasing mechanism described above has functioned. Lever 2036 (Figures 11 and 15) pivoted to lever 2035 at 1906 is provided with an ear 2061 adapted to engage in a notch 2057 in bar 2055 as the latter is moved to the right by lever 2058, and to restrain the bar from returning to key locking position so long as the key is held depressed. It will be recalled that lever 2035 is rocked counter-clockwise about its pivot 2037 by downward movement of the parallel bar 2030, and this movement thereof is transmitted through spring 2043 to lever 2036.

It will be observed that should the operator be pressing down upon a locked up multiplier key, it would depress during the instant when notch 2057 is being moved the slight extra distance to the right which is necessary to insure engagement thereof by ear 2061, and nothing heretofore described would prevent ear 2061 from engaging in notch 2057 so as to prevent the proper functioning of bar 2055, which is to lock the subsequently operated key in depressed position. To prevent such misfunctioning there is provided, a pawl 2069 (Figure 11) pivoted on a depending portion of the parallel bar 2030 and pressed against a limit stop provided by impingement of the tail of the pawl against pivot head 1908, by a spring 2070 compressed between the pawl and the parallel bar.

Pawl 2069 moves slightly upwardly and then downwardly with the parallel bar 2030 in such an operation as postulated above, and engages an ear 2078 on lever 2036 to rock said lever about its pivot on lever 2035, compressing spring 2043 and preventing engagement of ear 2061 in notch 2057. The key lock bar 2055 is therefore free to move leftwardly to lock the key in depressed position.

Obviously the pawl 2069 must release lever 2036 before the next oscillation of key release lever 2058, however, in order to insure against relocking of the same key in the event it is being held down by the operator. This releasing action is effected by a lever 2079 (Figure 11) rockably mounted on a shaft 1152 and provided adjacent its upper end with a pin 2095 adapted to engage the edges of a pointed extension 2096 on pawl 2069 to rock said pawl and release lever 2036 therefrom.

Lever 2079 is operated by the carriage dipping mechanism through a link indicated by dot and dash lines 2097 pivoted to the lower arm of lever 2079 and connected to the link 1713 (see also Figure 4) through a supporting lever 2098 pivotally mounted in the frame. Referring to Figure 4, it will be seen that said link 1713 is pivoted at 598 to arm 1714 keyed to shaft 600 to which there is likewise keyed a bifurcated arm 599 embracing pin 602 on the carriage dipping links 566 operated by cams 574.

These cams 574 effect a release of lever 2036 from pawl 2069 before the retraction of lock bar 2055, which it will be recalled is effected by cam 747 (Figure 28), and the ear 2061 of lever 2036 will therefore be freed to restrain a return of the lock bar during a setting clutch operation initiated by depression of a key the release of which it is desired to insure. Where a key is being pressed down by the operator during a setting clutch cycle initiated by another key, it is not freed to go down until after the rocking of pawl release lever 2079 by the carriage dip cams and slightly before the completion of the retraction of the lock bar 2055 by the main clutch opening cam. Lever 2036 therefore will be restrained by pawl 2069 so that lock bar 2055 may move to the left and lock the key in depressed position.

When a multiplier key above the "1" key is depressed, the V-slot bar 120 (Figures 7 and 8) moves toward the right with the result that lever 2050 which hangs from shaft 2004 (Figure 7) and is spring urged to the left, is rocked by lever 2003 engaging its projection 2052. This removes ear 2053 from over the upturned end of the lever 2051 so as to permit spring 633 (Figure 28) to rock lever 632 and its roller 634 to latch the main clutch dog 395 until its release by the trip-off devices hereinafter described. The lever 2051 normally prevents latching of the main clutch dog through its contact wtih ear 2049 on the tail of latch 632.

Figure 7:
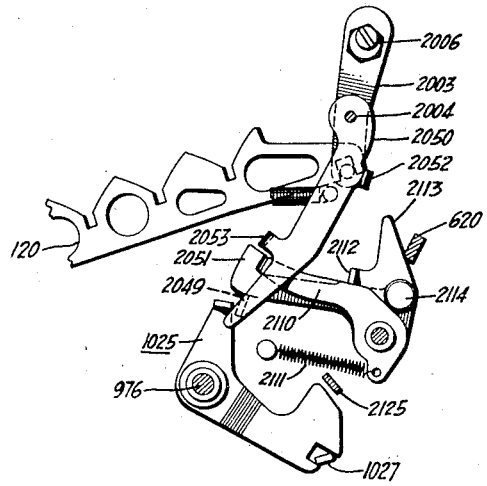
Figure 7 is a sectional view illustrating the mechanism for determining single or plural cycle operation selectively.

To prevent displacement of lever 2050 and depression of a higher multiplier key immediately after the "1" key has been depressed, a blocking lever 2110 (Figure 7) is urged upwardly by spring 2111. The blocking lever 2110 is normally held down (as shown in Figure 7) by an ear 2112 on a bell crank 2113 pivoted at 2114 to the lever 2051. The lug 620 on the main clutch dog 395 (see also Figure 28) engages the bell crank 2113 when the main clutch is not in operation. When the main clutch dog is released, the lug 620 thereon moves upwardly permitting spring 2111 to swing the blocking lever 2110 into its blocking position behind the ear 2053 on the lever 2050. Lever 2051 is urged in a clockwise direction by a spring identical to the spring 2111 and disposed directly behind the spring 2111 (as viewed in Figure 7).

To stop the machine after a predetermined number of multi-cyclic operations have occurred, cams 2021, 2023, and 2024, and bell crank 2022 are employed. As appears in Figure 13, the right hand face of cam 2021 has a lateral cam face at 2070, so that at the beginning of a clockwise or counter-clockwise rotation of cam 2021 the tip 2071 of the universally pivoted bell crank 2022 is moved aside and rides along the outside face of the cam until the high point thereof has been passed, when the bell crank end is moved back into cooperative relation with the peripheral face of the cam by spring 2122 which includes a pin 2123 therein to act as a guide for the spring and to centralize lever 2022. As the cam approaches the end of its rotation, the bell crank is rocked in a counter-clockwise direction. This rocks lever 2072 clockwise about its pivot and rocks lever 2117 counter-clockwise. Lever 2117 is pinned to shaft 626 which, as appears in Figure 28, is the same shaft to which the main clutch dog latching lever 632 is pinned; thus, this counter-clockwise movement of lever 2117 also rocks the lever 632 in a counter-clockwise direction to release the main clutch dog.

The inside face of cam 2023 (Figure 13) is provided with similar cam faces, as appears at 2076, so that a roller 2077 on bell crank 2022 first rides about the outside face of that cam and then onto the peripheral surface of the cam to ride over the high point thereof, irrespective of whether the cam is rotating in a clockwise or a counter-clockwise direction. When a "2" selection is made, and cam 2024 is rotated by gear 2020, the cam follower 2022 follows the periphery of the triangular-shaped cam 2024, under the pull of spring 2122, and rocks levers 2072, 2117, and shaft 626 upon riding over the high point of the cam 2024.

Shift mechanism

Power driven means are included in the present machine for shifting the carriage 250 either to the right or to the left. This movement of the carriage is under the control of a member 1300 (Figure 23) supported on a shaft 1301. This member is connected by a link 1374 (see also Figure 33) to a lever 1375 which is rocked counter-clockwise or clockwise about a supporting shaft 1376 to move the member 1300 likewise. The link 1374 includes a flexible connection comprising a spring unit 1373 similar to the construction of the unit 723 (Figure 18) to yield in the event of misoperation. When the member 1300 is rocked clockwise, a dog 1302 connected thereto is positioned in engagement with a toothed wheel 1303 and when the member 1300 is moved counter-clockwise a dog 1304 thereon is moved into engagement with a wheel 1305. The engagement of the toothed wheel 1303 or 1305 results in a selective shifting of the carriage in either of opposite directions.

A gear 362 (Figure 24), suitably driven by the motor in a manner not shown, is journaled on a shaft 1306 which is positioned between the center and right side frames 524 and 610. Gear 648 is also journaled on shaft 1306 and is coupled by a member 1307 to the gear 362. Member 1307 is secured by rivets to the gear 648, the same rivets fixing a spider 1309 to said gear.

An internal ring gear 1315 is welded to the spider 1309. This gear is in mesh with three planetary gears 1316 (see also Figure 23) riveted to one end of shafts 1317 which have gear teeth 1322 formed intermediate their ends. These shafts extend through openings provided in the toothed wheel 1303 and are journaled in bearings formed in plates 1318 and 1319 which are rigidly connected together by suitable spacers (not shown). The gears 1316 on shafts 1317 mesh with a sun gear 1320. The sun gear 1320 is formed upon an end of sleeve 1321 to which star wheel 1305 is keyed, shaft 1306 being turned down to receive the sleeve 1321. Gears 1322 formed on the shafts 1317, mesh with sun gear 1327 to which is secured gear 1324.

Gear 648 is always rotated when the motor is rotating, so that the ring gear 1315, planetary gears 1316, and their associated gears 1322 turn idly. If the toothed wheel 1303 is held, however, by dog 1302, revolution of the planetary gears 1316 and 1322 is prevented and the planetary gears serve to rotate the sun gear 1327 and its associated gear 1324 to turn gear 1326 with which gear 1324 is in mesh. If, however, the star wheel 1305 is held by dog 1304 rocking into engagement therewith, the sun gear 1320 will be held stationary and the planetary gears 1316 and 1322 will both revolve and rotate with the internal ring gear 1315 whereby the gear 1324 will be driven in the opposite direction and the rotational direction of gear 1326 is utilized to effect a shift of the carriage in either direction.

The gear 1326 is rotatably mounted on a shaft 1331 between friction discs 1330 and 1332 keyed to said shaft. A sleeve 1333 is also rotatably mounted on the shaft 1331 and supports a cam 1334 thereon (Figures 24 and 25) while a centralizer disc 1335 is keyed to the shaft 1331. Spring 1337 is compressed between washer 1338 and lock nuts 1339 on the threaded end of shaft 1331. This construction provides for the support of gear 1326 on the shaft 1331 and for a friction drive connection effected by discs 1330 and 1332 which are keyed to shaft 1331 and pressed against the gear 1326 by spring 1337 bearing against the washer 1338, the centralizer cam 1335, and the spacer 1333.

The shaft 1331 is supported in a suitable bearing 1340 provided in the left control plate 524 of the machine. A bevel gear 1341 is fixed on the end of the shaft and meshes with bevel gear 1342 mounted on the lower end of vertical shaft 334. Shaft 334 is supported in an adjustable angle bracket 1343 secured to the base plate of the machine and carrying a sleeve bearing 1344 riveted to the angle bracket and which supports an end of the shaft 1331.

When link 1374 is first moved to either the right or left, latch lever 1350 (Figure 25) is released from against ear 1354 to rock about shaft 1351 under the pull of spring 1352 and seat its projection 1353 either above or below ear 1354 on member 1300 so that the member 1300 is latched, and rotation of the unit commences.

Upon rotation of shaft 1331, lever 1350 is moved by cam 1334 (Figure 25) to release the ear 1354 at about the middle of the cycle. It is noted that the cam 1334 includes two opposite steep rises over which the nose 1357 rides. Upon clockwise rotation of the cam from the position shown in Figure 25, the nose 1357 rides over one of these at about the middle of the cycle. To secure the same cyclic time of operation of the lever 1350, the cam 1334 is free on the shaft and is driven by the centralizer disc 1335. As appears in Figure 25, this disc includes two shoulders 1360 on opposite sides thereof. Upon counter-clockwise rotation of the centralizer disc 1335 from the position shown in Figure 25, pin 1361 on cam 1334 is engaged by the shoulder 1360 in the opposite side only after the centralizer has rotated nearly half a revolution so that the rocking of the arm 1350 and disengagement of the ear 1354 occurs at the correct cyclic time.

A centralizer disc 1362 (Figures 23 and 24) carries two rollers 1363 against which an arm of bell crank 1364 bears under the pull of spring 1369 so as to centralize the drive unit as well as the shaft 334 and the carriage proper.

*Automatic carriage shift control*

During automatic division and multiplication operations the carriage is automatically shifted from one position to the next after completion of a calculation in each carriage order. Initiation of this carriage shift is effected by raising of the dipping portion of the carriage 250 (see Figure 4) at the end of a calculation in each carriage order.

A floating lever 1377 (Figures 4 and 26) is pivoted by a pin 1379 to a lever 1380, which is pivotally supported by the shaft 1376. The left hand end of the lever 1377, as viewed in Figure 26, is weighted so as to urge the lever in a counter-clockwise direction while the right hand end thereof is formed with a nose 1385 which normally lies below and against the tripping ear 1386 (Figure 4) carried by the cam follower lever 570. When the cam follower lever 570 is rocked in a clockwise direction to engage the gears 271 with gears 189, the ear 1386 is moved to the right, as viewed in Figure 4, the weighted end of lever 1377 assisted by a spring 1382 acting through a lever 1392 pivoted on a shaft 225 effects rocking of the lever 1377 in a counter-clockwise direction so that its nose lies to the left of the ear 1386. The lever 1377 is prevented from moving beyond this position by a shoulder 1390 which now underlies the ear 1386. Upon the following restore clutch operation and raising of the carriage, the cam lever 570 is rocked in a counter-clockwise direction and the lever 1377 is therefore moved to the left to rock the lever 1380 in a counter-clockwise direction. A dog 1383 having a shoulder thereon adapted to engage an extension 1384 on the link 1374 (Figures 26 and 33) is pivotally connected to the upper end of the lever 1380. This dog 1383 is adapted to be rocked from a position illustrated in Figures 26 and 33, to a position wherein the upper shoulder formed thereon is adapted to engage the projection 1384 of the link 1374. Leftward movement of this dog 1383 by raising of the dipping portion of the carriage 250 will, with the upper shoulder of dog 1383 in engagement with projection 1384, effect leftward movement of the link 1374 to engage the dog 1304 with the star wheel 1305 and start a shift of the carriage to the left.

To insure that the carriage shift is limited to a single step, the lever 1377 is rocked clockwise and disengaged from the extension 1386 during the first shift cycle. A lever 1355 (Figure 26) is pivoted on a shaft 1351 and is urged to swing clockwise by a spring 1359 into engagement with the rollers 1363 on the disc 1362. Therefore upon rotation of the disc 1362 by the shaft 1331 during a shift operation the lever 1355 is rocked counter-clockwise and a stud 1356 thereon engages the downwardly extending tail of a bell crank 1387. This bell crank has a shelf 1389 thereon which underlies the lever 1377 so as to rock the same clockwise to release nose 1385 from the ear 1386.

Upon release of restraint upon the floating lever 1377 by ear 1386 the shift mechanism is moved into a neutral position by a centralizing lever 1410 (Figure 26). Lever 1410 is suspended from a pivot pin 1411 suitably secured to the machine framework and is pivotally connected at its lower end by means of a pin 1411 to links 1412 and 1418 forming part of the motor switch control linkage (not shown). The centralizer lever 1410 has a lug 1410a extending therefrom above the shaft 1376 and in engagement with the lever 1380. An adjustable member including a pair of guide fingers 1415 is secured to the lower end of lever 1410 and the uppermost of these guide fingers is formed with a shoulder abutting the lever 1380 below the shaft 1376. A spring 1400 is tensioned between a machine frame stud 1401 and a lug 1402 formed on the centralizer lever 1410 to urge the same counter-clockwise into engagement with the lever 1380. Thus, regardless of which way the lever 1380 is rocked the centralizer lever 1410 tends to move the same into its neutral illustrated position.

The centralizer lever 1410 also extends in engagement with the lever 1375 (Figure 33) so as to centralize the lever 1300 (Figure 23) in its neutral illustrated position wherein neither of the dogs 1302 and 1304 are in engagement with their respective ratchet wheels when no other restraint is applied to the link 1374.

The dog 1383 (Figures 26 and 33) is normally urged, by a tension spring 1218, into its illustrated position wherein a lower shoulder formed thereon is adapted to engage an ear 1217 formed on a lever 1219 pivoted to the machine framework at 1220 and connected by a pin and slot connection 1219' to the lever 1375. Upon leftward movement of the dog 1383 in a manner described hereinbefore, the lowermost shoulder of this dog will engage and rock the lever 1219 to cause a rightward movement of the link 1374 through the lever 1375 and therefor cause the dog 1302 (Figure 23) of the member 1300 to engage the star wheel 1303 and effect a rightward instead of leftward shift of the carriage 250.

*Manual control for direction of automatic shift and non-shift*

During multiplication operations of the machine, which include automatic carriage shifts, it is desirable sometimes that the shift be in a left hand direction, and other times in a right hand direction. It is likewise desirable, in some instances, that the shift be disabled altogether. In order to control the direction of the automatic shift or to disable the shift when desired, the control keys 1200, 1201, and 1202 are provided (see Figures 1 and 29). Each of these shift control keys is mounted on a key stem 1203, the three stems being substantially identical and each being supported for vertical movement on pins 1204 and 1205. Each of the three stems is also provided with a spring 1206, normally urging it upwardly and each is provided with a laterally extending arm carrying an ear 1207. Carried on the pins 1204 of the key 1200 and the key 1201 is a latch member 1208. This latch member is provided with slots which surround the pins to permit sliding movement relative to the keys and a spring 1209 normally urges the latch member to the left. The latch member 1208 is provided with three identical latching noses having inclined edges 1210 for cooperation with the ears 1207 on the three keys. Thus, upon depression of any one of the shift control keys, its ear 1207 urges the latch member 1208 to the right against the tension of its spring 1209 and becomes locked beneath the related nose when it is fully depressed and the spring 1209 returns the latch member to the left. Depression of any one of the keys will cause release of any key previously depressed.

In order to prevent two of the keys from being depressed and left down at the same time, an interlocking plate 1211 is mounted for free sliding movement on the pins 1204 of the keys 1200 and 1201 adjacent the latch plate 1208. The interlocking plate 1211 is provided with a pair of upwardly extending wedge-shaped projections 1213 which fall between the ears 1207 of the three keys. Depression of any one of the keys will cause its associated ear 1207 to engage with one of the wedges 1213 on the interlocking member 1211 and slide that member to a position where its wedges will block the ear 1207 of the other keys and thus prevent depression of the other keys. Through this means it is impossible to depress any two keys simultaneously, the width of the wedge-shaped member 1213 being greater than the spacing between the ears 1207.

When it is desired that an automatically initiated carriage shift take place in a left hand direction, the control key 1201 is depressed. The ear 1207 of this key engages the tail of a lever 1214 pivoted at 1215 and rocks this lever in a counter-clockwise direction so that a shelf 1216 at its right hand end engages and raises the dog 1383 into position for engagement by the ear 1384 (see Figure 33) thus causing the automatically initiated carriage shift to subsequently take place in a left hand direction in the manner heretofore described.

The normal direction of automatic carriage shift is to the right and the function of the shift control key 1202 is therefore simply to release the shift control key 1201 or the non-shift key 1200, thus to insure a normal right hand shift. When the other keys have been released by depression of key 1202 (Figure 29) the dog 1385 will be urged clockwise for engagement with an ear 1217 by means of a spring 1218. Thus, under these conditions, upon left hand movement of the dog 1383, it will engage with the ear 1217 to rock the lever 1219 counter-clockwise, imparting a clockwise movement to shift control member 1375 and a right hand movement to link 1374, thus rocking the member 1300 to a position where its dog 1302 engages with the ratchet wheel 1303 (Figure 23) to cause a right hand shift to take place in the manner heretofore described.

Figure 29:
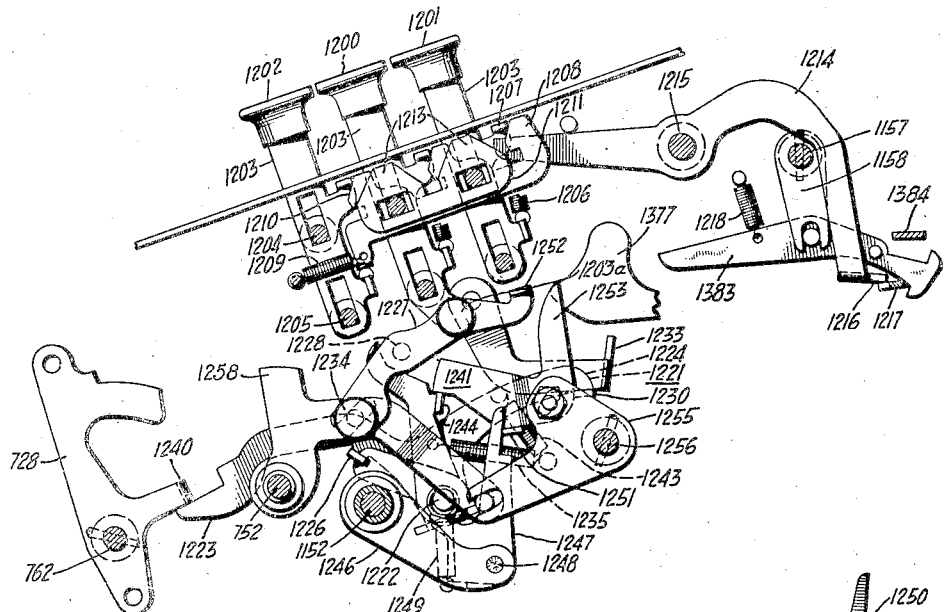
Figure 29 is a sectional view illustrating the keys for controlling the direction of automatic shift and also the non-shift key and mechanism employed for disabling the automatic shift.

The automatic carriage shift in either direction may be disabled by depression of the non-shift key 1200 (Figure 29) which, through mechanism presently to be described, effects a lifting of the left hand end of lever 1377 (Figures 4, 26, and 29). In Figure 26 it appears that upon the raising of the left end of lever 1377, the right hand end thereof will be lowered so that the ear 1386 which is moved to the left upon raising of the carriage, will override the lever 1377 rather than engage it to effect a shift, as has been described.

Figures 30, 31:
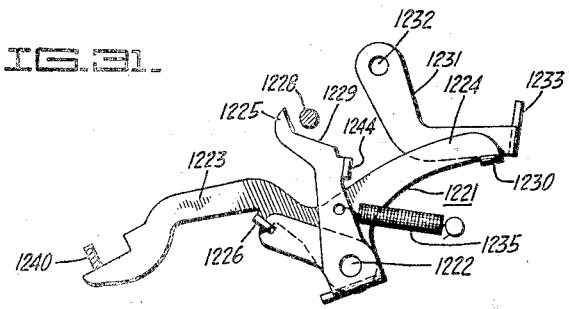
Figure 30 is a sectional view of the trip mechanism illustrated in Figure 29.
Figure 31 is a sectional view illustrating the mechanism controlled by the addition or subtraction bars for rendering the automatic shift control mechanism ineffective.

The mechanism for disabling the shift upon depression of the non-shift key 1200 is illustrated in Figures 29 and 31. A rocking member 1221, mounted on a shaft 1222, comprises a leftwardly extending arm 1223, a rightwardly extending arm 1224, and an upwardly extending arm 1225. The upwardly extending arm 1225 is separately formed but mounted on the same shaft 1222 and has a slotted portion engaging an ear 1226 on the arm 1223 to cause the three arms 1224, 1225, and 1223 to function as a single unit.

In order to disable the shift, the non-shift key 1200 is depressed. Pivotally connected to the key stem 1203 at 1203a, and to a member 1258 at 1234 is a link 1227 having a pin 1228 thereon midway between pivots 1203a and 1234. Depression of key 1200 lowers the right end of link 1277 so that pin 1228 engages an inclined edge 1229 on the arm 1225 to swing the rocker 1221 in a counter-clockwise direction. An ear 1230 on the arm 1224 will thereupon raise a lever 1231 pivoted at 1232 and cause an extension 1233 thereon to lift the lever 1377 into the non-shift position.

The automatic shift is disabled in multiplication operations as long as the non-shift key 1200 remains depressed. However, upon depression of either of the shift control keys 1201 and 1202 the non-shift key is released and drawn upwardly by spring 1206. A spring 1235 (Figure 31) then urges the member 1221 clockwise to its normal position, permitting the shift to take place automatically.

Figure 32:
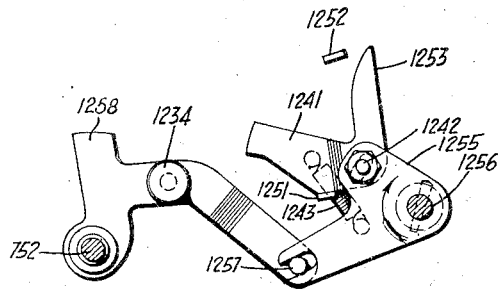
Figure 32 illustrates mechanism controlled by the division key for controlling the carriage shifting mechanism.

Disabling of the automatic shift upon operation of the plus or minus bars during addition and subtraction operations is also effected through the mechanism disclosed in Figures 29 and 31. The add bar control member 728 which moves in a clockwise direction upon depression of either the plus or minus bars, as will be recalled from the description of Figures 19 and 20 carries an ear 1240, engageable with the left hand end of arm 1223 of rocker member 1221 to rock this member counter-clockwise and through the lever 1231 and lever 1377 disable the automatic shift. In order to maintain the shift disabled when the add control member 728 is again moved in a counter-clockwise direction, a latch 1241 (see Figures 29 and 32) loosely pivoted at 1242 and urged in a counter-clockwise direction by spring 1243, falls behind an ear 1244 on the arm 1225 of the rocker member 1221. This causes the shift to remain disabled until such time as the carriage rise mechanism operates. The carriage rise causes a lever 1246 (Figures 29 and 30) to swing upwardly, this lever being carried by the same hub on the shaft 1152 as the lever 2079 which is operated by the carriage dipping mechanism (see Figures 4 and 11). When the lever 1246 is thus swung upwardly by the carriage rising operation during the restore clutch cycle, a finger 1247 pivoted thereto at 1248 and urged clockwise by a spring 1249 moves upwardly so that its shoulder 1250 engages an ear 1251 upon the latch 1241 to release said latch and permit the rocking member 1221 to return to its normal position under influence of its spring 1235.

In the previously described disabling of the automatic shift under influence of the non-shift key 1200, the latch 1241 does not come into play due to the fact that an ear 1252 carried on an extension at the lower end of the non-shift key engages with an upwardly extending tail 1253 on the latch 1241, preventing said latch from coming into locking position.

*Multiple addition and subtraction control*

Multiple addition and subtraction operations can be secured by simultaneously depressing the addition bar 800 or the subtraction bar 860 (Figure 19) with a multiplier key 2001 of a value representing the number of additions or subtractions to be made of a set up appearing in the keyboard. The effect of depressing the addition or subtraction bar is to prevent an automatic carriage shift operation by rocking the floating lever 1377 (Figures 26 and 29) by virtue of the mechanism described in connection with Figure 29.

The keyboard is also cleared in the manner disclosed hereinbefore in connection with Figure 6.

Due to the fact that the multi-cyclic control of the actuating mechanism by the various multiplier keys 2001 supersedes any single cycle control either by the add or subtract bars 800 or 860, respectively, or by the number "1" multiplier control key, a multi-cyclic operation will ensue.

*Automatic control of carriage shift during division*

As is disclosed in detail in the above mentioned Avery Patent Number 2,271,240, division control mechanism is provided to automatically control operation of the machine during division, and to cause the carriage shifting mechanism to shift the carriage one step to the left after the quotient is determined in each order. During a division operation the carriage shift control of the division mechanism supersedes the manually settable direction control means so that regardless of which of the keys 1200 or 1201 and 1202 (Figure 29) is depressed, the carriage will always shift to the left during division.

Figure 33:
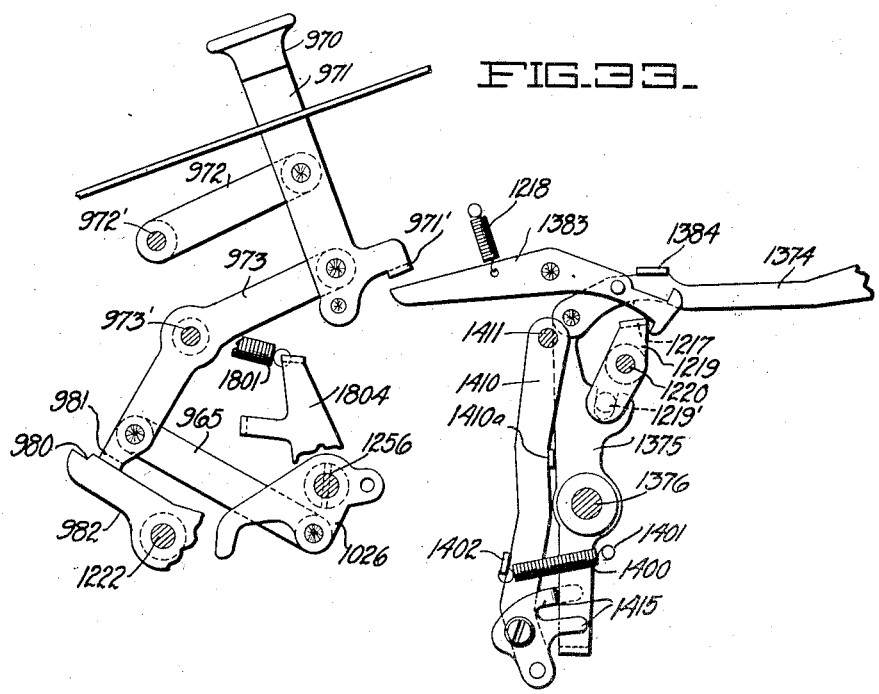
Figure 33 illustrates the division initiating key and means operable thereby for automatically predetermining the direction of carriage shift during division operation.

Referring to Figure 33, a division key 970 for initiating a division operation is mounted on a key stem 971 for vertical movement by a parallel linkage comprising levers 972 and 973. These levers are pivotally mounted at 972' and 973', respectively, to the machine framework and the lever 973 is connected by means of a link 965 to an arm 1026 which is pinned to a rockable shaft 1256. Also pinned to the shaft 1256 is an arm 1004 which is urged in a counter-clockwise direction by a spring 1001 tensioned between the arm 1004 and a part of the machine framework (not shown) to maintain the key 970 in its raised illustrated position.

Upon depression of the key 970 to initiate operation of the division control mechanism (not shown) a shoulder 981 on the lever 973 passes beyond a shoulder 980 formed on a latch member 982 which is pivotally mounted on a shaft 1222 and spring urged in a clockwise direction by means not shown, so as to latch the key 970 in a depressed position during operation of the division control mechanism.

During the downward travel of the key 970 a lug 971' formed on the division key stem 971 engages the dog 1383 to rock the same against the action of the tension spring 1218 until the upwardly extending shoulder thereon is moved to a position wherein it is adapted to engage the ear 1384 formed on the link 1374 so as to effect a carriage shift toward the left upon rising of the dipping portion of the carriage in the manner disclosed hereinbefore in connection with the shift control mechanism.

Downward movement of the division key 970 also rocks shaft 1256 clockwise, through the linkage described above, and this movement is effective to reenable the carriage shifting controls in the event the non-shift key 1200 is latched down. For this purpose there is pinned on shaft 1256 (see Figure 32) an arm 1255 pivotally connected at 1257 to an arm 1258 on shaft 752, so that arm 1258 is rocked counter-clockwise upon clockwise movement of shaft 1256.

A broad headed stud 1234 on arm 1258 (see also Figure 29) constitutes one pivotal support for the link 1227 the opposite end of which is pivotally connected to the stem 1203 of non-shift key 1200, and midway between these pivotal supports 1234 and 1203a, on link 1227 is the stud 1228, which as above described is effective to disable the carriage shifting controls upon depression of the non-shift key 1200.

Counter-clockwise movement of arm 1258, effected by depression of the division key 970 as described above, moves the pivotal support 1234 on a radius about shaft 752, carrying stud 1228 away from the face 1229 (Figure 31) of lever arm 1225 permitting spring 1235 to rock lever 1221 clockwise, depressing ear 1230 so that lever 1231 will no longer hold up the end of link 1377. Link 1377 will therefore be returned to its normal position, reenabling the automatic shifting mechanism although the non-shift key 1200 will remain latched down.

Upon termination of the division operation the latch 982 (Figure 33) is moved by means (not shown) to release the lever 973 and thereby allow the tension spring 1001 (Figure 33) to return the division key 970 to its normal raised position. Since the lug 971' on the division key stem 971 is moved from engagement with the dog 1383, the tension spring 1218, or the lever 1214 (Figure 29), depending upon which is in controlling position, will then become effective to control the position of the dog 1383.

Raising of the division key also effects counter-clockwise movement of shaft 1256 through a linkage which has been described, and concurrent clockwise movement of the arm 1258 pivotally connected to the arm 1255 secured to shaft 1256, thus returning the pivotal support 1234 of link 1227 to the position which it occupied before depression of the division key. If the non-shift key 1200 is latched down, this return movement of stud 1234 will carry stud 1228 against the face 1229 of lever arm 1225, and rock lever 1221 counter-clockwise to again raise lever 1231 and the end of link 1377 disabling the automatic shifting controls. If the non-shift key is in raised position however, the return of stud 1234 will merely position the parts so as to make it possible to disable the shifting controls by depression of said key.

In the machine described in detail in the aforesaid Avery Patent Number 2,271,240, the division key 970 is unlatched and permitted to rise just prior to the completion of operation in the leftmost carriage position, and may be unlatched and permitted to rise upon the operation of a special "stop" key under similar conditions in any carriage position. The arrangement is such that the rising of the carriage, under such circumstances, takes place after the return of the division key to raised position, and the carriage shifting controls would therefore be actuated.

It is desirable to prevent actuation of the carriage shifting controls as an incident to the interruption or termination of a division operation, and in order to prevent such actuation, the latch 1241 (Figure 29) hereinbefore referred to in connection with the description of the disabling of the shift controls in addition and subtraction operations, is pivotally mounted on the arm 1255 fixed to shaft 1256 which is rocked clockwise by depression of the division key and counter-clockwise when the division key rises.

The clockwise movement of arm 1255 removes latch member 1241 from its normal position in contact with the upper edge of ear 1244 permitting it to be rocked counter-clockwise by its spring 1243 until an ear 1251 thereon is stopped by arm 1255, but carries it to the right (as viewed in Figure 29) to a position in which it is wholly ineffective.

The subsequent counter-clockwise movement of arm 1255 then carries the latch member 1241 to the left bringing it against the face of ear 1244 and rocking the lever arm 1225, on which ear 1244 is formed, counter-clockwise to raise the end of link 1377 and disable the automatic shifting controls so that no actuation thereof takes place during the carriage rise immediately following the return of the division key 970 to raised position.

After the carriage rise has progressed beyond the point at which actuation of the carriage shifting controls would otherwise take place, latch 1241 is released from ear 1244, by the same mechanism, comprising arm 1246 and pawl 1247 (Figure 30) which performs this function in addition and subtraction operations.

*Modified shift and non-shift control*

Figure 35 illustrates a modified form of shift and non-shift control as disclosed in the above mentioned Avery Patent No. 2,211,736 for rendering the shift control mechanism inoperative in single or multiple addition and subtraction operations, or for preventing an automatic carriage shift in multiplication operation.

In this case the shaft 809 (Figures 20 and 35) to which the lever 807 is secured has a lever 1420 also secured thereto. It will be recalled that when the addition or subtraction bars 800 and 860, respectively, are depressed, the lever 807 and the shaft 809 are rocked clockwise and therefore the lever 1420 is likewise so rocked. The lever 1420 carries a pin 1421 overlying an extension of a lever 1422 pivotally mounted on a rockable shaft 1441 so that when the addition bar 800 or subtraction bar 860 is depressed, the lever 1422 is rocked counter-clockwise against the action of a spring 1424 tensioned between the lever 1422 and a support pin 1443. A floating lever 1377' is provided which is similar in function and construction to that of 1377 (Figures 4 and 26) with the exception that the left end thereof is formed with a tail 1378 (Figure 35).

It will be recalled that when the machine is at rest, the lever 1377 (Figure 26) is held rocked slightly clockwise as illustrated, and therefore the corresponding lever 1377' will also be held rocked in its illustrated position at this time. However, upon a setting clutch operation and in the absence of any means preventing rocking of the lever 1377', this lever will be rocked slightly counter-clockwise by any suitable means such as a spring (not shown), or weight at the left end thereof until the shoulder thereon corresponding to the shoulder 1390 (Figure 26) of the lever 1377 contacts the under surface of the lug 1386. The lever 1377' will therefore assume a position somewhat counterclockwise of its illustrated position preparatory to initiation of an automatic carriage shifting movement.

As the lever 1422 is rocked counter-clockwise as above described an ear 1425 thereon engages the tail 1378 of the floating lever 1377'. Thus the lever 1377' is rocked to move the nose thereof, corresponding to the nose 1385 of the lever 1377 (Figure 4) below the ear 1386, rendering the automatic carriage shifting mechanism ineffective.

As the lever 1422 reaches the end of its counter-clockwise rocking movement it moves into the notch 1426 formed in a latch lever 1427. Lever 1427 is pivoted on the pin 1443 and is urged in a counter-clockwise direction by a spring 1430 to retain the lever 1422 in its raised position and to hold the lever 1377' in its ineffective position until release by the restore clutch 700 or stop key 985 as will presently appear.

It will be remembered that upon termination of operation in any particular carriage order, the restore clutch 700 is operated. This clutch 700 has connected to the driving side thereof a cam 849 engaged by cam follower 1818 pivoted at 1819 and pivotally connected to a link 846 which, in turn, is connected to a lever 847 pivoted on a pin 976. A second link 845 is pivotally connected between the lever 847 and a second lever 844 pivotally supported on a pin 822 and has an ear 1428 thereon which, upon leftward movement of the link 846 by the cam 849, engages a tail 1429 on the latch member 1427 to rock the same in a clockwise direction against the pull of spring 1430 to release the lever 1422 and allow the spring 1424 to pull this lever clockwise to enable the floating lever 1377' to move from its illustrated ineffective position when otherwise permitted to do so.

If desired, a stop key 985 (Figure 35) may be utilized to remove the latch member 1427 from latching engagement with the lever 1422. The key stem of the stop key 985 is vertically slidable over pins 986 and is normally held in a raised position by a spring 1075. A lug 1076 on the lower end of this key stem is in engagement with an arm 1077 secured to a rockable shaft 1078 which also has secured thereto an arm 1100 having an ear 1101 thereon underlying the latch lever 1427. Thus, depression of the stop key 985, through the arms 1077 and 1100, will also rock the latch lever 1427 clockwise.

To effect a non-shift control of the mechanism illustrated in Figure 35 during multiplication a lever 1440 rockably mounted on the pin 1441 is provided. This lever extends through the keyboard cover of the machine and is centralized in either of two extreme rocked positions by an expansible link 1442 similar in principle to that illustrated at 723 (Figure 18), the linkage extending between the pin 1443 which supports the lever 1427 and a pin 1444 on the lower end of the lever 1440.

In that position shown in Figure 35, the lever 1440 is in a "shift" position wherein it will permit any shift initiated during a multiplication operation of the machine to ensue. However, if the lever 1440 is rocked counter-clockwise to its "non-shift" position, the pin 1444 rides against the under surface of the lever 1422 and moves that lever counter-clockwise to engage the tail 1378 of the lever 1377' and rock it about its pivot to ineffective position. The control lever 1440 includes an extension 1445 carrying a roller which engages a cam surface formed on an extension 1446 of the latch lever 1427 when the lever 1440 is moved to non-shift position. This disables or rocks the latch lever 1427 clockwise to prevent the same from latching the lever 1422, the link 1442 being sufficiently able to retain the levers 1422, 1440, and 1377' in their rocked positions.

Figure 36 illustrates still another modified form of shift and non-shift control for rendering the shift control mechanism inoperative in single or multiple addition or subtraction, or for preventing an automatic carriage shift in multiplication operation. In this modification a non-shift key 1448 is mounted on the upper end of a key stem 1449 which is pivotally connected to a lever 1422', this lever being similar in function to the lever 1422 shown in Figure 35. Upon rocking of the lever 1422' by depression of the non-shift key 1448 or upon rocking of the same lever by depression of the addition or subtraction bar in the manner described in connection with Figure 35, an ear 1425' of lever 1422' engages the tail 1378 of a lever 1377' and rocks the latter lever into its ineffective position, in which it will not be capable of transmitting a carriage shift initiating movement to the shift control mechanism following a multiplication, addition, or subtraction operation in a manner described hereinbefore. Upon movement of lever 1422' to the shift disabling position, the ear 1425' enters into a notch 1426 of a latch member 1427 which is rocked to latching position by a spring 1430, thereby maintaining the lever 1422' and the floating lever 1377' in shift disabling position. During the first operation of the restore clutch following a multiplication, addition or subtraction operation, the link 845 is moved to the left in the same manner as described in connection with Figure 35, and the latch member 1427 is moved clockwise to release lever 1422' and the floating lever 1377' from their latched position, whereupon the spring 1424 is enabled to return lever 1422' and the key 1448 to their illustrated positions.

I claim:

1. In a calculating machine having a transversely shiftable carriage, actuating and registering mechanisms relatively displaceable by shifting said carriage, operation control means for said actuating mechanism, means for shifting said carriage, shift control means responsive to said operation control means upon termination of the operation of said actuating mechanism thereby to initiate operation of said shifting means, and a plurality of actuating devices for said operation control means operable to cause said means to initiate operation of said actuating mechanism; the combination of means controlled by one of said actuating devices for rendering said shift control means ineffective, and means responsive to said operation control means upon termination of the operation of said actuating mechanism thereby and operable subsequently to the time when initiation of the operation of said shifting means by said shift control means would take place if said shift control means were effective, for again rendering said shift control means effective.

2. In a calculating machine having a transversely shiftable carriage, actuating and registering mechanisms relatively displaceable by shifting said carriage, operation control means for said actuating mechanism, and means for shifting said carriage, shift control means responsive to said operation control means upon termination of the operation of said actuating mechanism thereby to initiate operation of said shifting means, and including a member adjustable to render said shift control means effective or ineffective, and a plurality of actuating devices for said operation control means operable to cause said means to initiate operation of said actuating mechanism; the combination of means controlled by one of said actuating devices for adjusting said member to render said shift control means ineffective, means for retaining said member in position to render said shift control means ineffective, and means responsive to said operation control means upon termination of the operation of said actuating mechanism thereby and operable subsequently to the time when initiation of the operation of said shifting means by said shift control means would take place if said shift control means were effective, for releasing said retaining means and restoring said member to position to render said shift control means effective.

3. In a calculating machine, the combination with registering mechanism, cyclically operable actuator mechanism therefor, a transversely shiftable carriage for one of said mechanisms, and means for shifting said carriage; of means operable as an incident to termination of operation of said actuator mechanism for effecting operation of said carriage shifting means, means for controlling operation of said actuator mechanism, control means operable by said last mentioned means for rendering said carriage shift effecting means inoperative, means for latching said control means in operative position, and manually settable means for rendering the carriage shift effecting means inoperative and for releasing said latch means.

4. In a calculating machine having a transversely shiftable carriage, actuating and registering mechanisms relatively displaceable by shifting said carriage, operation control means for said actuating mechanism, and means for shifting said carriage; the combination of shift control means responsive to said operation control means upon termination of the operation of said actuating mechanism thereby to initiate operation of said shifting means, and including a member adjustable to render sad shift control means effective or ineffective, a key adjustable to set position, a plurality of actuating devices for said operation control means operable to cause said means to initiate operation of said actuating mechanism, means controlled by one of said actuating devices for adjusting said member to render said shift control means ineffective, means controlled by said key for adjusting said member to render said shift control means ineffective, and means controlled by another of said actuating devices and effective while said key is in set position for rendering said shift control means effective.

5. In a calculating machine the combination with registering mechanism, actuating mechanism therefor, a transversely shiftable carriage for one of said mechanisms, and means for shifting said carriage; of means comprising a clutch operable as an incident to termination of operation of said actuating mechanism and normally effective to initiate operation of said carriage shifting means, means for rendering said normally effective means ineffective to initiate operation of said carriage shifting means, means for holding said normally effective means in such ineffective condition, and means controlled by said clutch for releasing said holding means.

6. In a calculating machine having a transversely shiftable carriage, means for shifting said carriage including a cyclic clutch, actuating and registering mechanisms relatively displaceable by shifting said carriage, operation control means for said actuating mechanism including a clutch and a control member for disengaging said last named clutch to arrest operation of said actuating mechanism, control means for said cyclic clutch responsive to said control member upon movement thereof to effect termination of the operation of said actuating mechanism to engage said cyclic clutch and thus initiate operation of said shifting means, and a plurality of actuating devices for said operation control means operable to cause said means to initiate operation of said actuating mechanism; the combination of means comprising an adjustable member having an operating connection with said cyclic clutch control means for disabling and enabling the latter in accordance with the adjustment of said adjustable member, settable key means for adjusting said member, and means controlled by one of said actuating devices and effective while said key means is set so as to disable said cyclic clutch control means for adjusting said adjustable member to render said cyclic clutch control means effective.

7. In a calculating machine having a transversely shiftable carriage, actuating and registering mechanisms relatively displaceable by shifting said carriage, operation control means for said actuating mechanism including a cyclic clutch, automatic multiplication control means comprising a series of value entering keys settable to cause engagement of said clutch; said multiplication control means being operable to cause disengagement of said clutch after a predetermined number of cycles of operation thereof; a second control means comprising a manually operable member settable to cause engagement of said clutch; said second means being operable to cause disengagement of said clutch after one or more cycles of operation thereof; means including a cyclic shift clutch for shifting said carriage, and shift control means responsive to said clutch disengaging means upon operation thereof for engaging said cyclic shift clutch; the combination of, means comprising a key adjustable to set position for rendering said cyclic shift clutch control means ineffective to initiate operation of said cyclic shift clutch upon operation of said automatic multiplication control means, and means controlled by said second control means and effective while said key is in set position for rendering said cyclic shift clutch control means effective.

8. In a calculating machine having a transversely shiftable carriage, actuating and registering mechanisms relatively displaceable by shifting said carriage, operation control means for said actuating mechanism including a cyclic clutch, a control member operable to disengage said clutch so as to arrest operation of said actuating mechanism, automatic multiplication control means comprising a series of value entering keys settable to cause engagement of said clutch; said means being operable to cause said control member to disengage said clutch after a predetermined number of cycles of operation thereof; automatic division control means comprising means settable to cause engagement of said clutch; said division control means being effective to cause disengagement of said clutch after a number of cycles of operation thereof determined by the relationship of values of factors in a division problem performed by said machine; means including a cyclic shift clutch for shifting said carriage, and shift control means responsive to said control member upon operation thereof to disengage said first mentioned clutch for engaging said cyclic shift clutch; the combination of, means comprising a key adjustable to set position for rendering said cyclic shift control means ineffective to initiate operation of said cyclic shift clutch, and means controlled by said division control means and effective while said key is in set position for rendering said cyclic shift control means effective.

9. In a calculating machine having a transversely shiftable carriage, actuating and registering mechanisms relatively displaceable by shifting said carriage, operation control means for said actuating mechanism including a cyclic clutch, automatic multiplication control means comprising means settable to cause engagement of said clutch and means operable to cause disengagement of said clutch after a predetermined number of cycles of operation thereof; a second control means comprising a manually operable member settable to cause engagement of said clutch, said second means being operable to cause disengagement of said clutch after one or more cycles of operation thereof; means including a cyclic shift clutch for shifting said carriage, and shift control means responsive to said clutch disabling means upon operation thereof for engaging said cyclic shift clutch; the combination of, means comprising a key adjustable to set position for rendering said cyclic shift clutch control means ineffective to initiate operation of said cyclic shift clutch upon operation of said automatic multiplication control means, and means controlled by said second control means and effective while said key is in set position for rendering said cyclic shift clutch control means effective.

10. In a calculating machine having a transversely shiftable carriage, actuating and registering mechanisms relatively displaceable by shifting said carriage, operation control means for said actuating mechanism including a cyclic clutch, a control member operable to disengage said clutch so as to arrest operation of said actuating mechanism, automatic multiplication control means comprising means settable to cause engagement of said clutch; said multiplication control means being operable to cause disengagement of said clutch after a predetermined number of cycles of operation thereof; automatic division control means comprising means settable to cause engagement of said clutch, said division control means being operable to cause disengagement of said clutch after a number of cycles of operation thereof determined by the relationship of values of factors in a division problem performed by said machine; means including a cyclic shift clutch for shifting said carriage, and shift control means responsive to said control member upon operation thereof to disengage said first mentioned clutch for engaging said cyclic shift clutch; the combination of, means comprising a key adjustable to set position for rendering said cyclic shift control means ineffective to initiate operation of said cyclic shift clutch, and means controlled by said division control means and effective while said key is in set position for rendering said cyclic shift control means effective.

11. In a calculating machine having a transversely shiftable carriage, actuating and registering mechanisms relatively displaceable by shifting said carriage, operation control means for said actuating mechanism, means for shifting said carriage, shift control means responsive to said operation control means upon termination of the operation of said actuating mechanism thereby to initiate operation of said shifting means, and a plurality of actuating devices for said operation control means operable to cause said operation control means to initiate operation of said actuating mechanism; the combination of, means controlled by one of said actuating devices for rendering said shift control means ineffective, means for latching said last mentioned means in ineffective condition, and means responsive to said operation control means upon termination of operation of said actuating mechanism thereby for releasing said latched means from said latching means.

HAROLD T. AVERY.